United States Patent
Nakamori et al.

(10) Patent No.: US 12,548,480 B2
(45) Date of Patent: Feb. 10, 2026

(54) HEAD-MOUNTED DISPLAY, HEAD-MOUNTED DISPLAY COOPERATION SYSTEM, AND METHOD FOR CONTROLLING HEAD-MOUNTED DISPLAY

(71) Applicant: MAXELL, LTD., Kyoto (JP)

(72) Inventors: Hiroshi Nakamori, Kyoto (JP); Hitoshi Akiyama, Kyoto (JP); Yasunobu Hashimoto, Kyoto (JP); Nobuo Masuoka, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/837,206

(22) PCT Filed: Feb. 10, 2022

(86) PCT No.: PCT/JP2022/005274
§ 371 (c)(1),
(2) Date: Aug. 9, 2024

(87) PCT Pub. No.: WO2023/152852
PCT Pub. Date: Aug. 17, 2023

(65) Prior Publication Data
US 2025/0191502 A1     Jun. 12, 2025

(51) Int. Cl.
*G06F 3/01*      (2006.01)
*G01J 1/42*      (2006.01)
(Continued)

(52) U.S. Cl.
CPC ............ *G09G 3/001* (2013.01); *G01J 1/4204* (2013.01); *G06F 3/012* (2013.01); *G06F 3/013* (2013.01);
(Continued)

(58) Field of Classification Search
CPC ........ G09G 3/001; G09G 3/012; G09G 3/013; G09G 2354/00; G09G 2360/144; G06V 20/20; G06V 40/18; G01J 1/4204
See application file for complete search history.

(56) References Cited

U.S. PATENT DOCUMENTS

2009/0278766 A1   11/2009   Sako et al.
2010/0079356 A1*  4/2010    Hoellwarth ............ H04B 1/385
                                                         345/8
(Continued)

FOREIGN PATENT DOCUMENTS

JP    07-288754 A      10/1995
JP    2008-083290 A    4/2008
(Continued)

OTHER PUBLICATIONS

International Search Report of PCT/JP2022/005274 dated Apr. 26, 2022.

*Primary Examiner* — Stephen G Sherman
(74) *Attorney, Agent, or Firm* — Mattingly & Malur, PC

(57) ABSTRACT

A head-mounted display compares a brightness in a surrounding environment based on a result of measurement by a surrounding light sensor with a surrounding light threshold predetermined for providing a user with a warning, and when the brightness in the surrounding environment is equal to or less than the surrounding light threshold and also when detecting that the user wearing the head-mounted display has performed a surrounding-environment-recognition-preparation-action for switching an action of viewing the display to an action of viewing the surrounding environment, executes control of outputting notification information for letting the user know that a visibility in the surrounding environment reduces, or executes control of outputting a control signal for a lighting fixture.

11 Claims, 27 Drawing Sheets

(51) Int. Cl.
*G06V 20/20* (2022.01)
*G06V 40/18* (2022.01)
*G09G 3/00* (2006.01)

(52) U.S. Cl.
CPC .............. *G06V 20/20* (2022.01); *G06V 40/18* (2022.01); *G09G 2354/00* (2013.01); *G09G 2360/144* (2013.01)

(56) References Cited

U.S. PATENT DOCUMENTS

| | | |
|---|---|---|
| 2010/0177114 A1 | 7/2010 | Nakashima |
| 2013/0321346 A1* | 12/2013 | Tyler .................... G06F 3/0488 345/175 |
| 2015/0102984 A1 | 4/2015 | Wong et al. |
| 2018/0081428 A1* | 3/2018 | Liu ......................... G06F 3/013 |
| 2019/0392216 A1* | 12/2019 | McPeters ............... G06V 20/20 |
| 2020/0098335 A1* | 3/2020 | Chen ....................... G09G 5/10 |
| 2020/0135139 A1* | 4/2020 | Nishizawa ............. G06V 20/20 |
| 2021/0020141 A1 | 1/2021 | Yuasa et al. |
| 2021/0349322 A1* | 11/2021 | Harris ................. G02B 27/0176 |
| 2022/0028356 A1* | 1/2022 | Grant ...................... G09G 5/36 |

FOREIGN PATENT DOCUMENTS

| | | | |
|---|---|---|---|
| JP | 2010-164782 A | 7/2010 | |
| WO | WO-2006103196 A1 * | 10/2006 | ......... B60R 16/0231 |
| WO | 2019/176577 A1 | 9/2019 | |

* cited by examiner

ACTION OF PLACING HAND ON HMD 10

FIG.24

| SELECT | NAME | LOCATION | FUNCTION |
|--------|------|----------|----------|
| ☐ | a | ROOM A, CEILING | LIGHTING |

511

| SELECT | NAME | LOCATION | FUNCTION |
|--------|------|----------|----------|
| ☐ | a | ROOM A, CEILING | LIGHTING |
| ☐ | b | ROOM A, DESK | LIGHTING/ DETAILED SETTINGS |
| ☐ | ... | ... | ... |

512

| SELECT | NAME | LOCATION | FUNCTION |
|--------|------|----------|----------|
| ☐ | a | ROOM A, CEILING | LIGHTING |
| ☐ | b | ROOM A, DESK | LIGHTING/ DETAILED SETTINGS |
| ☐ | ... | ... | ... |

513

| SELECT | NAME | LOCATION | FUNCTION |
|--------|------|----------|----------|
| ☐ | b | ROOM A, DESK | LIGHTING/ DETAILED SETTINGS |
| ☐ | ... | ... | ... |

| SCREEN LUMINANCE DURING DISPLAY | LUMINANCE OF RECOMMENDED LIGHTING FIXTURE |
|---|---|
| HIGH | BRIGHT |
| INTERMEDIATE | -- |
| LOW | DARK |

521

| PUPIL SIZE | LUMINANCE OF RECOMMENDED LIGHTING FIXTURE |
|---|---|
| SMALL | BRIGHT |
| MEDIUM | -- |
| LARGE | DARK |

522

HEAD-MOUNTED DISPLAY, HEAD-MOUNTED DISPLAY COOPERATION SYSTEM, AND METHOD FOR CONTROLLING HEAD-MOUNTED DISPLAY

TECHNICAL FIELD

The present invention relates to a display technology for a head-mounted display (hereinafter, abbreviated as "HMD").

BACKGROUND ART

As a background art of the technical field of the present invention, Patent Literature 1 discloses a technique for a see-through HMD which enables a user to visually recognize a surrounding environment promptly in the case of sudden change in the brightness in the surrounding environment.

CITATION LIST

Patent Literature

Patent Literature 1: WO2019/176577

SUMMARY OF INVENTION

Technical Problem

In many cases, a user uses an immersive HMD while blocking his or her surrounding environment, which makes it difficult for the user to know the brightness in the surrounding environment in real time. For example, when a user did not notice that it got dark in the surrounding environment (real world) while using an HMD, he or she cannot grasp the situation in the surrounding after taking the HMD off, which may cause a problem that the user may hit the body against an object, wall, and the like if moving in darkness.

On the other hand, changing the luminance of a screen of the head-mounted display in real time depending on the brightness in the surrounding environment may cause the sense of immersion that a user can feel while using the head-mounted display to be impaired.

Accordingly, an immersive HMD has been required to appropriately assist a user when he or she takes off the HMD while considering the sense of immersion that the user is feeling. However, Patent Literature 1 relates to a see-through HMD, and thus the technique disclosed in Patent Literature 1 is not sufficient for an immersive HMD even if it is applied thereto as it is to achieve balance between maintaining of the sense of immersion and assistance for a user, and thus further improvement is required.

The present invention has been made in view of the circumstances described above, and an object of the present invention is to reduce the inconvenience that a user feels due to decrease in the visibility caused by a difference between the luminance of a screen of a head-mounted display and the brightness of an external light, while considering a sense of immersion that the user can feel while using the head-mounted display.

Solution to Problem

In order to solve the problem above, the present invention includes the features described in the scope of claims. One of the aspects of the present invention is a head-mounted display comprising: a processor; a display with a non-transparency; a surrounding light sensor for detecting a brightness in a surrounding environment; and a notification device for outputting notification information to a user of the head-mounted display, and the processor being configured to: compare the brightness in the surrounding environment based on a result of measurement by the surrounding light sensor with a surrounding light threshold predetermined for providing the user with a warning; and when the brightness in the surrounding environment is equal to or less than the surrounding light threshold, and also when detecting that the user wearing the head-mounted display has performed a surrounding-environment-recognition-preparation-action for switching an action of viewing the display to an action of viewing the surrounding environment, execute control of outputting, from the notification device, the notification information for letting the user know that a visibility in the surrounding environment reduces.

Advantageous Effects of Invention

According to the present invention, it is possible to reduce the inconvenience that a user feels due to decrease in the visibility caused by a difference between the luminance of a screen of a head-mounted display and the brightness of an external light, while considering a sense of immersion that the user can feel while using the head-mounted display. The problems, configurations, and advantageous effects other than those described above will be clarified by explanation of the embodiments below.

BRIEF DESCRIPTION OF DRAWINGS

FIG. 16A illustrates an example of a state of a light being turned on.
FIG. 16B illustrates an example of a state of a light being turned on.

FIG. 24 illustrates variations of a recommended lighting fixture selection window.

FIG. 25 illustrates an example of a luminance recommendation table.

DESCRIPTION OF EMBODIMENTS

When a user wearing an HMD, in particular, an immersive HMD, takes off the HMD after viewing a screen of the HMD, he or she may feel dazzling due to the difference between the brightness of a screen of the HMD and the brightness in the surrounding environment. For the purpose of assisting a user while considering the darkness adaptation or light adaptation when taking off an HMD after using it, the present invention provides an HMD, an HMD cooperation system, and a method of controlling an HMD. Thus, the present invention, from which technological improvements in the usability of head mounted-displays can be expected for labor-intensive industries, contributes to 8.2 "Achieve higher levels of economic productivity through diversification, technological upgrading and innovation, including through a focus on high-value added and labor-intensive sectors" of SDGs (Sustainable Development Goals) proposed by the United Nations.

Hereinafter, the embodiments of the present invention will be described with reference to the drawings. Throughout all the drawings for explaining the embodiments of the present invention, the common components are generally provided with the common reference signs, and the repetitive explanation therefor will be omitted.

First Embodiment

The first embodiment is an embodiment for providing a user with a notification that it is dark in the surrounding environment or a warning thereof when he or she tries to take off an immersive HMD 10 in the situation where it is relatively dark in the surrounding environment since the eyes of the user cannot adapt to the darkness so quickly.

Figure 1:
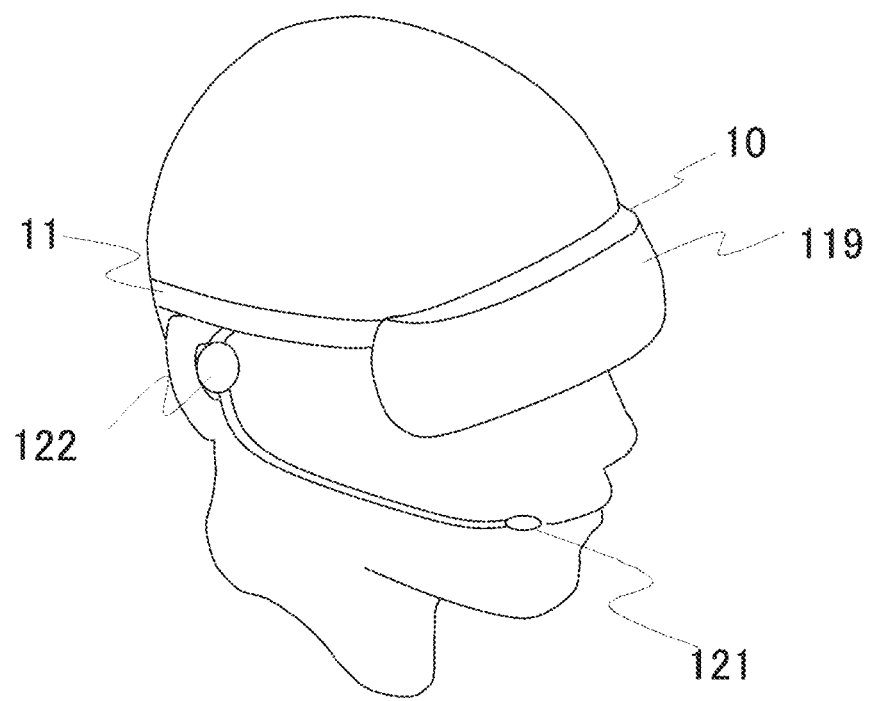
FIG. 1 illustrates the appearance of an immersive HMD.

FIG. 1 illustrates the appearance of the immersive HMD 10.

In the HMD 10, a wearing body 11 generally includes a display 119, a microphone 121, and a speaker 122.

The wearing body 11 is a member for keeping the HMD 10 worn on the head of a user of the HMD 10, and holding the other components of the HMD 10.

The display 119 is positioned in front of both the eyes of the user wearing the HMD 10. The display 119 is a liquid crystal display having a non-transparency. The display 119 has a transparency change mechanism (for example, a shutter) for changing the transparency, and thus controlling the transparency change mechanism by means of a processor 125 (see FIG. 2), which will be described later, causes the display 119 to be shifted from a non-transparent state to a transparent state. The display 119 functions as a notification device for outputting notification information by displaying a warning message or displaying a predetermined low-luminance screen. The display 119 also lets the user know that it is dark in the surrounding environment or gives the user a warning thereof by adjusting the luminance of a screen, and also prompts the user to adapt to the darkness.

The microphone 121 is one of the aspects of an input device used by the user to enter data to the HMD 10.

The speaker 122 functions as a notification device for outputting, from the HMD 10 to the user, notification information by means of music, warning sounds, or warning messages.

Figure 2:
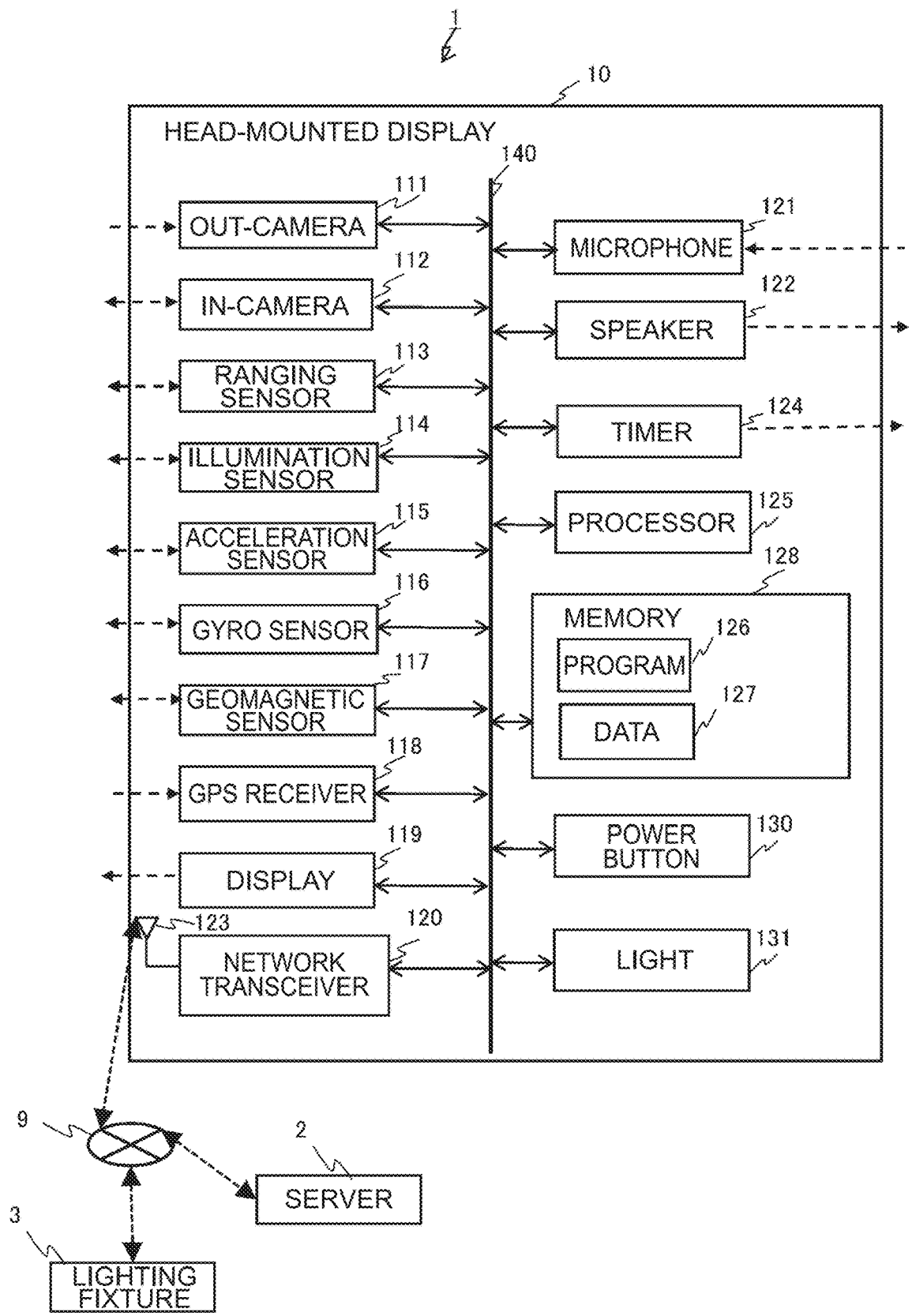
FIG. 2 is a hardware configuration diagram of an HMD.

FIG. 2 is a hardware configuration diagram of the HMD 10.

The HMD 10 includes an out-camera 111, an in-camera 112, a ranging sensor 113, an illumination sensor 114, an acceleration sensor 115, a gyro sensor 116, a geomagnetic sensor 117, a GPS receiver 118, a display 119, a network transceiver 120, the microphone 121, the speaker 122, a timer 124, the processor 125, a memory 128, and a power button 130, which are connected to each other via a bus 140 for connecting each of the components. In the fourth embodiment, a light 131 is provided as well.

The network transceiver 120 is, for example, a near field wireless transceiver or a wireless LAN transceiver. The network transceiver 120 is connected to an antenna 123. The HMD 10 is connected to a communication network 9, such as a home LAN, through the network transceiver 120 and the antennae 123. In the embodiment to be described below, a lighting fixture 3 is also connected to the communication network 9. Thus, the HMD 10 and the lighting fixture 3 are linked to each other, whereby an HMD cooperation system 1 is configured. The details thereof will be described later.

The near field wireless transceiver may be a transceiver adapted to the communication system of a wireless LAN, such as Bluetooth (registered trademark), IrDA (Infrared Data Association, registered trademark), Zigbee (registered trademark), HomeRF (Home Radio Frequency, registered trademark), or Wi-Fi (registered trademark).

The HMD 10 includes a surrounding light sensor for detecting the brightness in the surrounding environment. The illumination sensor 114 is an example of the surrounding light sensor. Alternatively, the luminance of a surrounding environment image, which is generated based on an image of the surrounding environment captured using the out-camera 111, may be analyzed to detect the brightness in the surrounding environment. In this case, the out-camera 111 functions as the surrounding light sensor.

The memory 128 is configured with a flash memory and a nonvolatile memory. The memory 128 also stores programs 126 of an OS (Operating System) and operation control application, and data 127 used by the processor 125.

The processor 125 is configured with, for example, a CPU. The processor 125 loads the programs 126 onto the memory 128 and executes them, and as necessary, reads the data 127 and uses it for execution of the processing of the programs 126.

Figure 3:
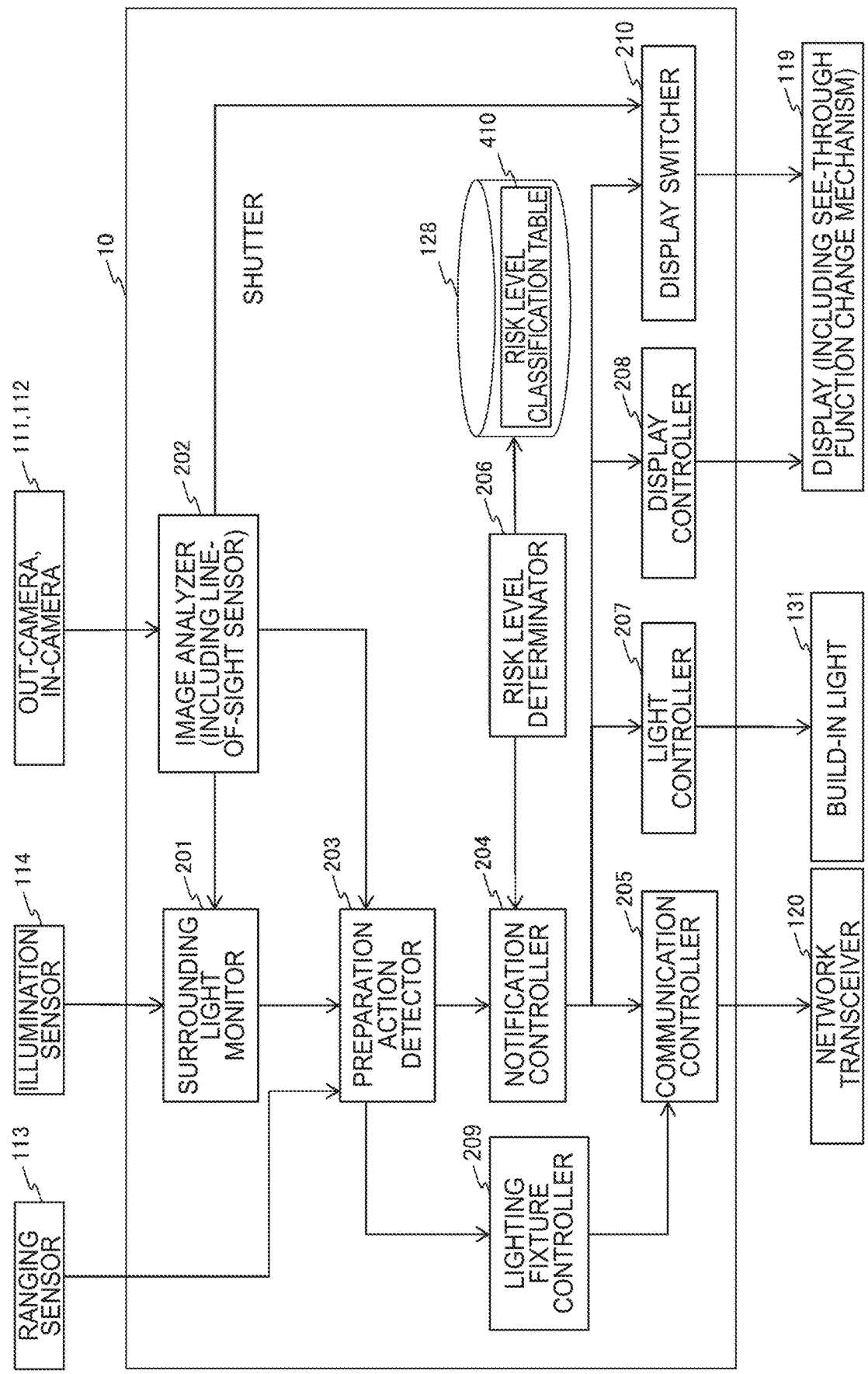
FIG. 3 is a block diagram illustrating a functional configuration of an HMD.

FIG. 3 is a block diagram illustrating a functional configuration of the HMD 10.

The processor 125 of the HMD 10 executes a surrounding light monitoring program, thereby configuring a surrounding light monitor 201, an image analyzer 202, a preparation action detector 203, a notification controller 204, a communication controller 205, a risk level determinator 206, a light controller 207, a display controller 208, a lighting fixture controller 209, and a display switcher 210. The function of each section will be described later with reference to the flowcharts. All of these sections do not necessarily have to be configured as long as only necessary sections are provided depending on each embodiment.

Figure 4:
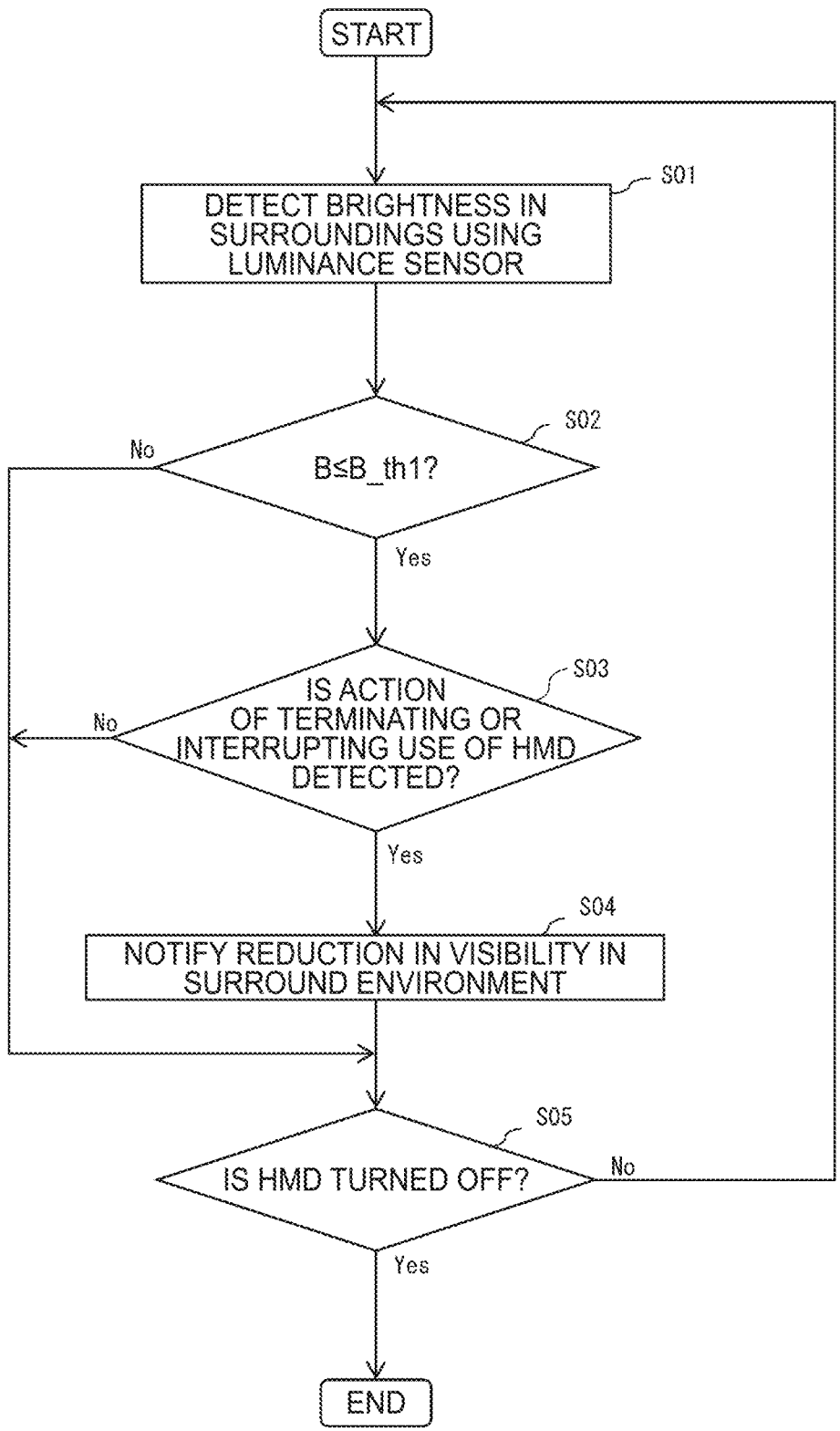
FIG. 4 illustrates a flowchart of a flow of the processing of an HMD according to the first embodiment.

FIG. 4 illustrates a flowchart of a flow of the processing of the HMD 10 according to the first embodiment.

Upon activation of the HMD 10, the processor 125 reads the surrounding light monitoring program from the memory 128 and starts the processing. The surrounding light sensor observes a light in the surrounding of a user of the HMD 10 to detect the brightness in the surrounding environment (S01).

In the case of using the illumination sensor 114 as the surrounding light sensor, the surrounding light monitor 201 acquires a sensor output from the illumination sensor 114, and the sensor output as acquired is used in the determination of the brightness in the surrounding environment in step S02. In the case of using the luminance of a surrounding environment image generated by the out-camera 111 as the surrounding light sensor, the image analyzer 202 calculates a representative value of the luminance of the surrounding environment image, for example, an average value of the pixels or a median value of the pixel distribution, and the result of calculation is used in the determination of the brightness in the surrounding environment in step S02.

The surrounding light monitor 201 compares a brightness B in the surrounding environment based on the result of measurement by the surrounding light sensor with a first surrounding light threshold B_th1 set in advance for providing a user with a warning. When the brightness B in the surrounding environment is more than the first surrounding environment threshold B_th1 (S02: No), the processing proceeds to step S05.

When the brightness B in the surrounding environment is equal to or less than the first surrounding light threshold B_th1 (S02: Yes) and a surrounding-environment-recognition-preparation-action is not detected (S03: No), the processing proceeds to step S05.

The surrounding-environment-recognition-preparation-action is a preparation action performed by the user wearing the HMD 10 when he or she switches an action from an action of viewing the display 119 to an action of viewing the surrounding environment. In other words, it can be said as the action performed by the user who tries to take off the HMD 10.

Figure 5:
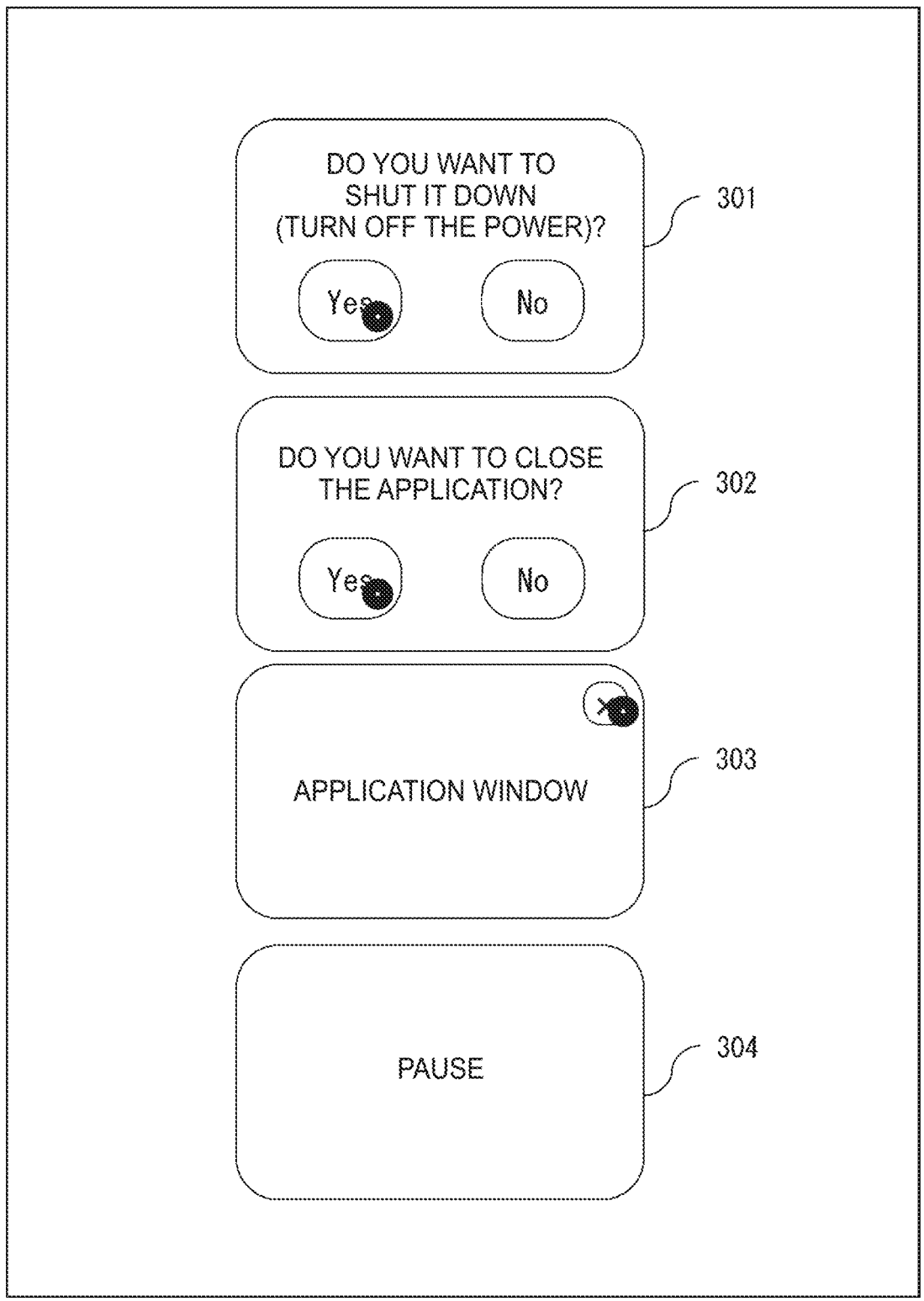
FIG. 5 illustrates an example of a screen display provided in the first embodiment.

FIG. 5 illustrates an example of a screen display provided in the first embodiment. In the HMD 10, the preparation action detector 203 determines that the surrounding-environment-recognition-preparation-action has been performed when a shutdown window 301 (turning off the power button 130) was displayed, at least one termination selection window 302 of an application being executed in the HMD 10 was displayed, an icon for selecting termination being shown on an application window was operated on an operation window 303, or a window 304 for pausing a movie was displayed (stopping a movie being played). This enables the user to be provided with a warning in step S04, which will be described later, with the user being in a state of immediately before turning off the HMD 10, being settled down, or not being disturbed from viewing a movie. Note that the operations by the user on each of the windows may be provided by means of the motion of the light-of-sight of the user which is detected by the image analyzer 202 (functions as a line-of-sight sensor) using a face image including the eyes captured by the in-camera 112. Alternatively, the operations of the user may be provided using a controller linked with the HMD 10. It may be considered that displaying of the shutdown window 301 includes an operation in which the user selects the shutdown window 301 from a menu window of the HMD 100 to display it. It also may be determined that, when the HMD 10 is turned off without the shutdown window 301 being displayed, an operation for the power button 130 or an operation in which the user selects to turn off the power from the menu window of the HMD 10 corresponds to the surrounding-environment-recognition-preparation-action.

Figure 6:
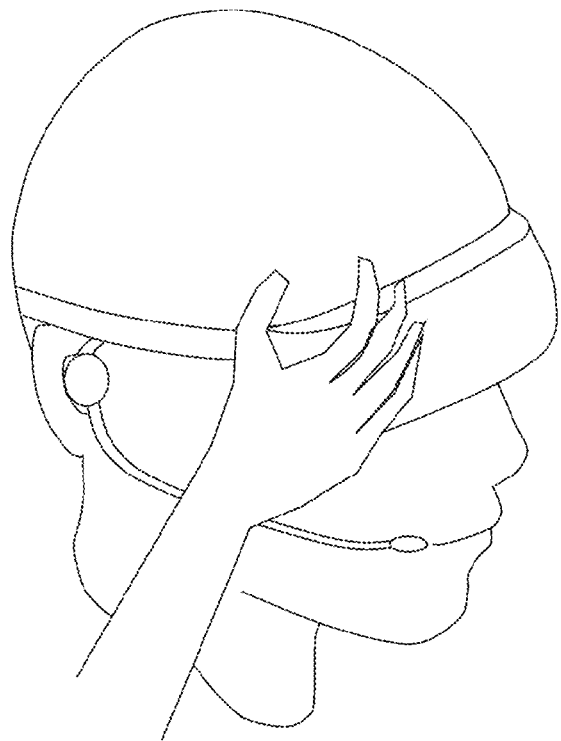
FIG. 6 illustrates an example of a surrounding-environment-recognition-preparation-action.
Figure 7:
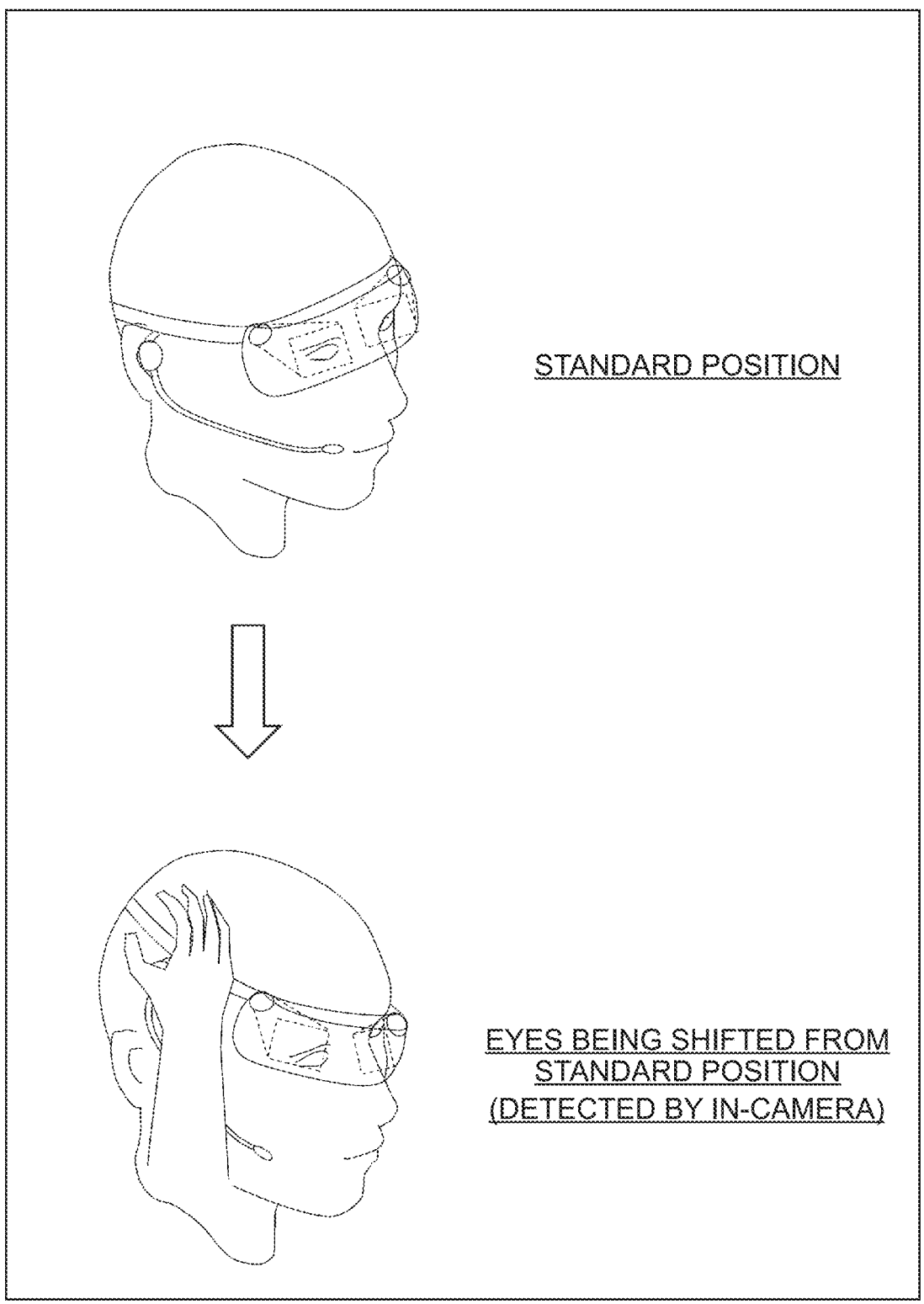
FIG. 7 illustrates an example of a surrounding-environment-recognition-preparation-action.
Figure 8:
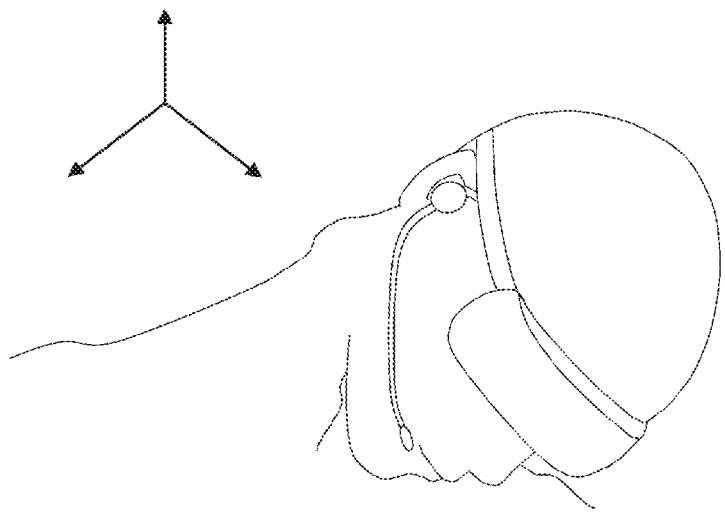
FIG. 8 illustrates an example of a surrounding-environment-recognition-preparation-action.

FIG. 6 to FIG. 8 illustrate examples of the surrounding-environment-recognition-preparation-action, respectively.

When the image analyzer 202 analyzes the surrounding environment image captured by the out-camera 111 and then determines that an action (see FIG. 6) in which the user is placing the hand on the HMD 10 is captured therein, or when the ranging sensor 113 detects that something has got close enough to touch the HMD 10, the preparation action detector 203 considers that the user has performed an action of placing the hand on the HMD 10 and determines that the surrounding-environment-recognition-preparation-action has been performed.

In FIG. 7, the image analyzer 202 carries out the image analysis on the face image including the eyes of the user in advance to predetermine a standard position of the eyes of the user relative to the HMD 10. Then, when it is found in the result of the analysis of the face image made in step S01 that the eyes of the user deviate from a range allowable based on the standard position, the preparation action detector 203 considers that the eyes are shifted from the standard position, that is, the user is trying to take off the HMD 100, and thus determines that the surrounding-environment-recognition-preparation-action has been performed.

In FIG. 8, when determining that the head of the user wearing the HMD 10 faces at the angle which is the same as or further downward than a predetermined angle threshold based on a sensor output (angle information) from the gyro sensor 16 or acceleration sensor 115 (preferably, a three-axis acceleration sensor), the preparation action detector 203 considers such an action as an action performed before the HMD 100 is taken off and then determines that the surrounding-environment-recognition-preparation-action has been performed. Determining the actions illustrated in FIG. 6 to FIG. 8 as the surrounding-environment-recognition-preparation-actions enables the user to be provided with a warning in step S04, which will be described later, while considering the sense of immersion into the HMD 10 that the user is feeling, even in case that the user suddenly tries to take off the HMD 10.

Referring back to FIG. 4, when the preparation action detector 203 detects the surrounding-environment-recognition-preparation-action (S02: Yes) in the situation where the brightness B in the surrounding environment is the same as or less than the first surrounding light threshold B_th1 (S03: Yes), the notification controller 204 notifies the user of the reduction in the visibility in the surrounding environment (S04).

Figure 9:
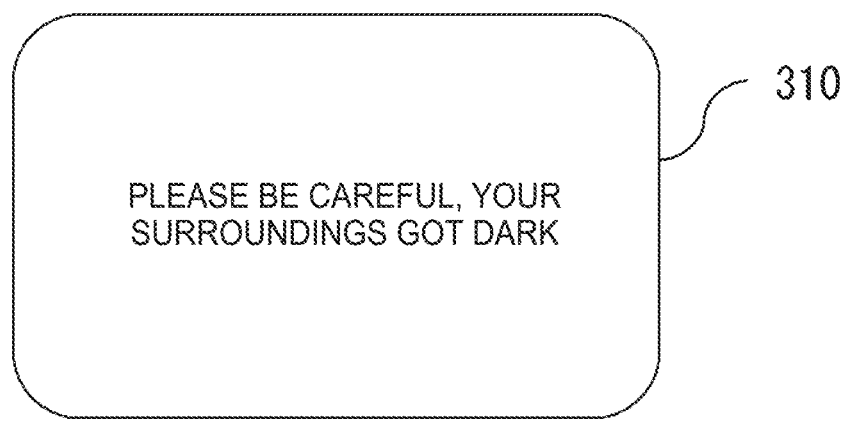
FIG. 9 illustrates an example of a notification mode.

FIG. 9 illustrates an example of a notification mode.

The notification controller 204 may cause the display controller 208 to display a warning message 310, "Please be careful, it is dark", on the display 119. Alternatively, the notification controller 204 may provide the audio information, "Please be careful, it is dark", from the speaker 122.

As a further example of the notification mode, the notification controller 204 may display a selection window that allows the user to select whether to watch a low-brightness video or listen to music for a predetermined time. For providing the low-brightness video, a specific video in which the brightness of the window gradually gets dark may be prepared so as to promote the user to adapt to the darkness, or the brightness of the screen of the display 119 displaying the application being executed or the video being played may be lowered. This enables the user to enjoy a movie or music while securing the time until the eyes of the user adapt to the darkness.

The processing returns to S01 and is continued until an action of turning off the HMD 10 is performed, for example, until the power is turned off (S05: No).

When the HMD 10 is turned off (S05: Yes), the series of processes of the surrounding light monitoring program is ended.

In the situation where a user is using the immersive HMD 10, when it relatively got dark (darker relative to the brightness of the display 119) in the surrounding environment of the user, it takes time for the eyes of the user to adapt to the darkness immediately after he or she takes off the HMD 10. This may cause a problem that the user who cannot grasp the surrounding environment may hit or stumble an object therein. According to the present embodiment, if it is darker than a predetermined brightness in the surrounding environment when a preparation action by the user for taking off the HMD 10 is detected, a notification for letting the user know that it is dark in the surrounding environment is provided. This enables the user using the HMD 10 to be provided with a warning while considering the sense of immersion to the HMD 10 that the user is feeling.

Second Embodiment

Figure 10:
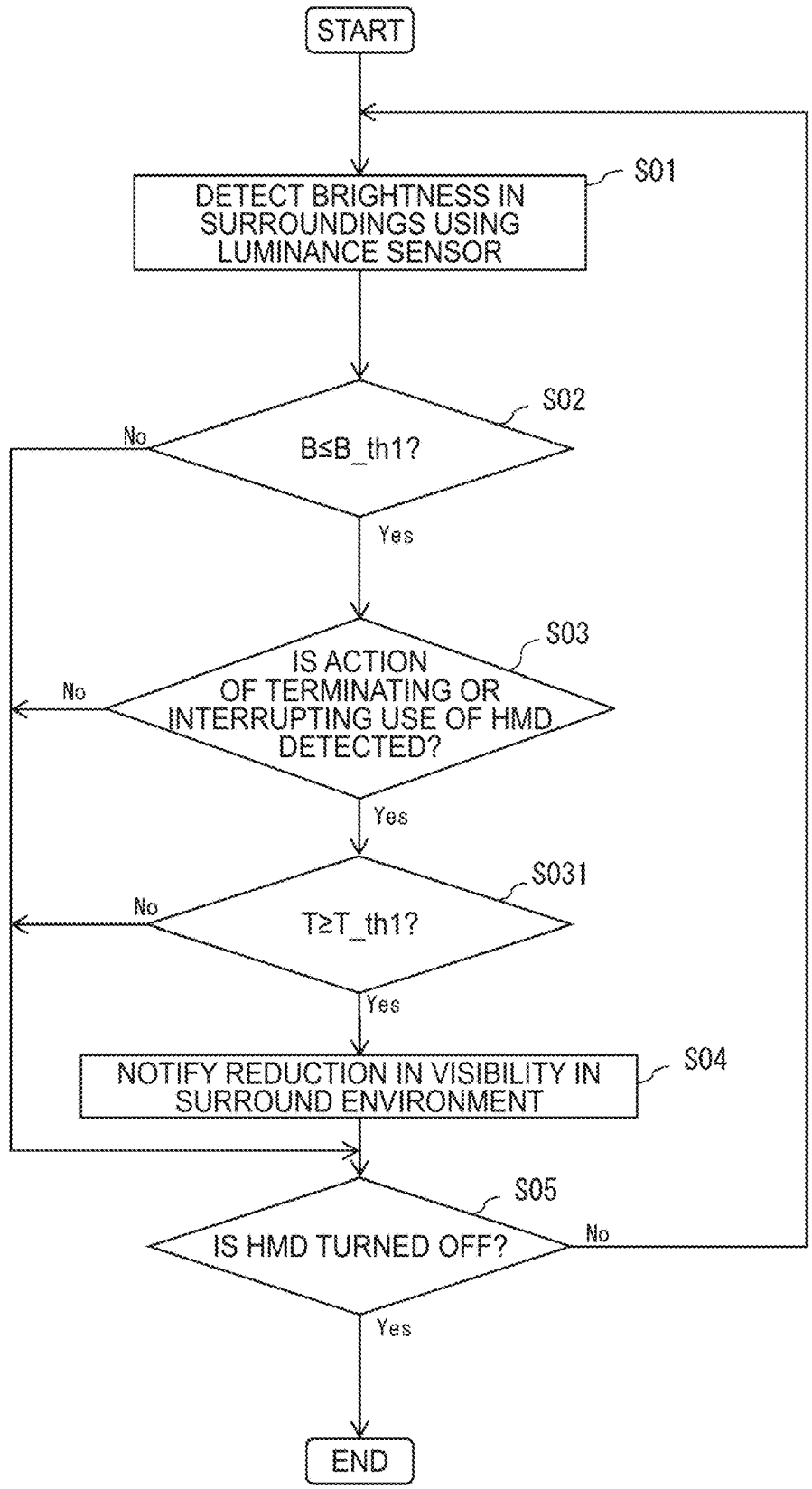
FIG. 10 illustrates a flowchart of a flow of the processing according to a modification of the second embodiment.

FIG. 10 illustrates a flowchart of a flow of the processing according to a modification of the second embodiment.

In the second embodiment, using the timer 124, an elapsed time T from activation of the HMD 10 or restoration from its sleep state is measured in advance. When the preparation action detector 203 detects the surrounding-environment-recognition-preparation-action (S03: Yes), if the elapsed time T after activation of the HMD 10 or restoration from its sleep state is less than a predetermined time threshold T_th1 (S031: No), the processing proceeds to step S05.

On the other hand, when the preparation action detector 203 determines that the elapsed time T is equal to or more than the predetermined time threshold T_th1 (S031: Yes), a notification that the visibility has reduced in the surrounding environment is provided (S04).

According to the present embodiment, setting the time threshold T_th1 based on a preparation time for wearing the HMD 10 can suppress unnecessary notifications since an action of adjusting shift of the position of the HMD 10 after being worn and an action of restarting the HMD 10 due to malfunction thereof are not detected as the surrounding-environment-recognition-preparation-actions.

Furthermore, setting the time threshold T_th1 while considering the time necessary for a user of the HMD 10 to adapt to the brightness can suppress frequent notifications and thus improve the usability. This is because the eyes of the user are not adapted to the luminance of the display 119 immediately after he or she starts viewing the HMD 10, and thus the visibility in the surrounding environment is not low for the user, which does not require the detection of the surrounding-environment-recognition-preparation-action.

Third Embodiment

The third embodiment is an embodiment for capturing a face area including the eyes of a user using the in-camera 112 to obtain a face image, and providing a user with a warning depending on the risk levels that are defined and classified in a plurality of stages based on the size of the pupils, transparency of the crystalline lens, and further information on the age, darkness adaptation speed, and eyesight of the user that have been recorded in advance in the memory 128 or server 2.

In general, the pupil immediately responds to change in the brightness, and becomes large as it gets dark. Darkness adaptation is influenced by the secretion volume of light-sensitive protein called "rhodopsin", and the secretion volume of "rhodopsin" differs with age. Thus, the age and the darkness adaptation speed are found to be related to each other, which can be used as indices for classification of the levels of risk.

Furthermore, the transparency of the crystalline lens and the eyesight also affect the visibility, which may be used as indices for classification of the levels of risk.

Figure 11:
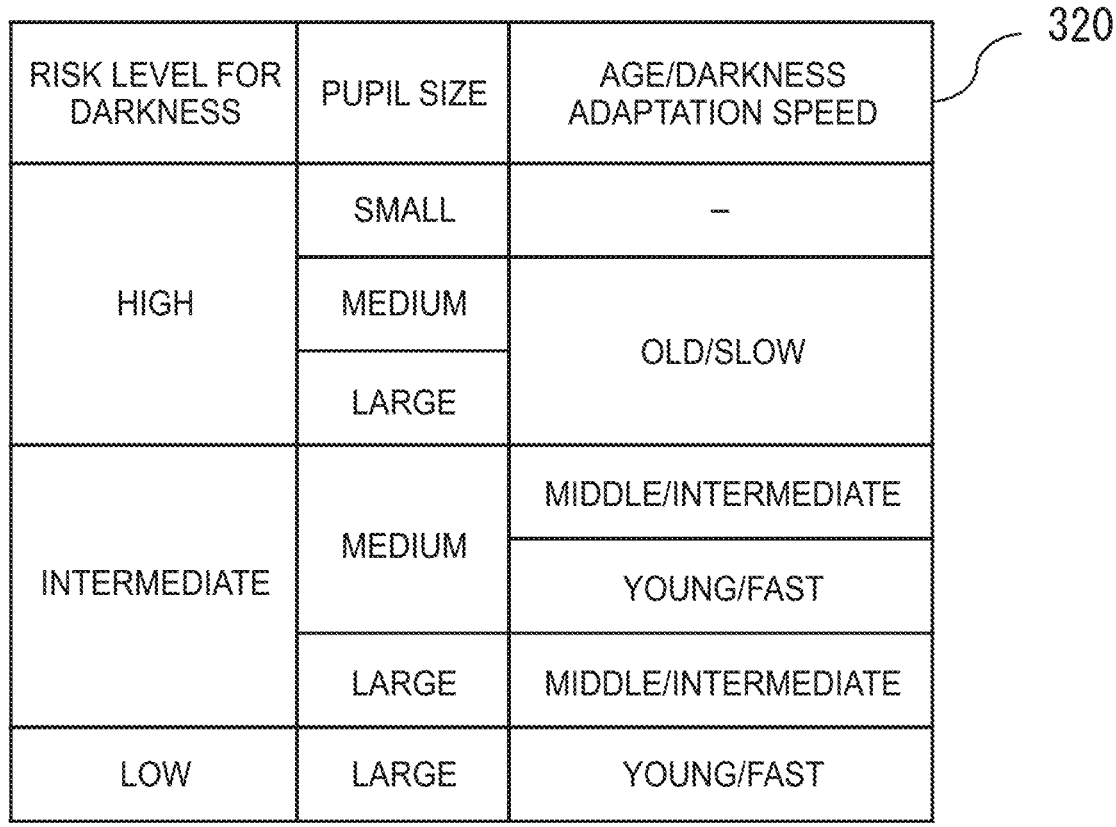
FIG. 11 illustrates a risk level classification table.

FIG. 11 illustrates a risk level classification table 410.

The risk level classification table 410 illustrated in FIG. 11 is stored in the memory 128 or server 2, and when being stored in the server 2, it is referred by the HMD 10 through the communication network 9.

In the risk level classification table 410, the risk level for darkness, size of the pupils, age, and darkness adaptation speed are made associated with each other and defined in three stages. Furthermore, the transparency of the crystalline lens and eyesight of the user may be considered therein. That is, the transparency of the crystalline lens of the user captured by the in-camera 112 may be compared with the typical transparency of the crystalline lens stored in advance in the memory 128 or server 2, and when the risk level determinator 206 determines that the transparency of the crystalline lens of the user is lower, the risk level may be increased by one stage. Furthermore, when the eyesight is equal to or less than a predetermined value, the risk level may be increased by one stage. In both the cases, the risk level may not be changed if it is already the highest. When the risk level is determined only using the information on either of the size of the pupils, transparency of the lens, age, darkness adaptation speed, or eyesight of the user, the risk level may be determined based on the degree of each information.

Figure 12:
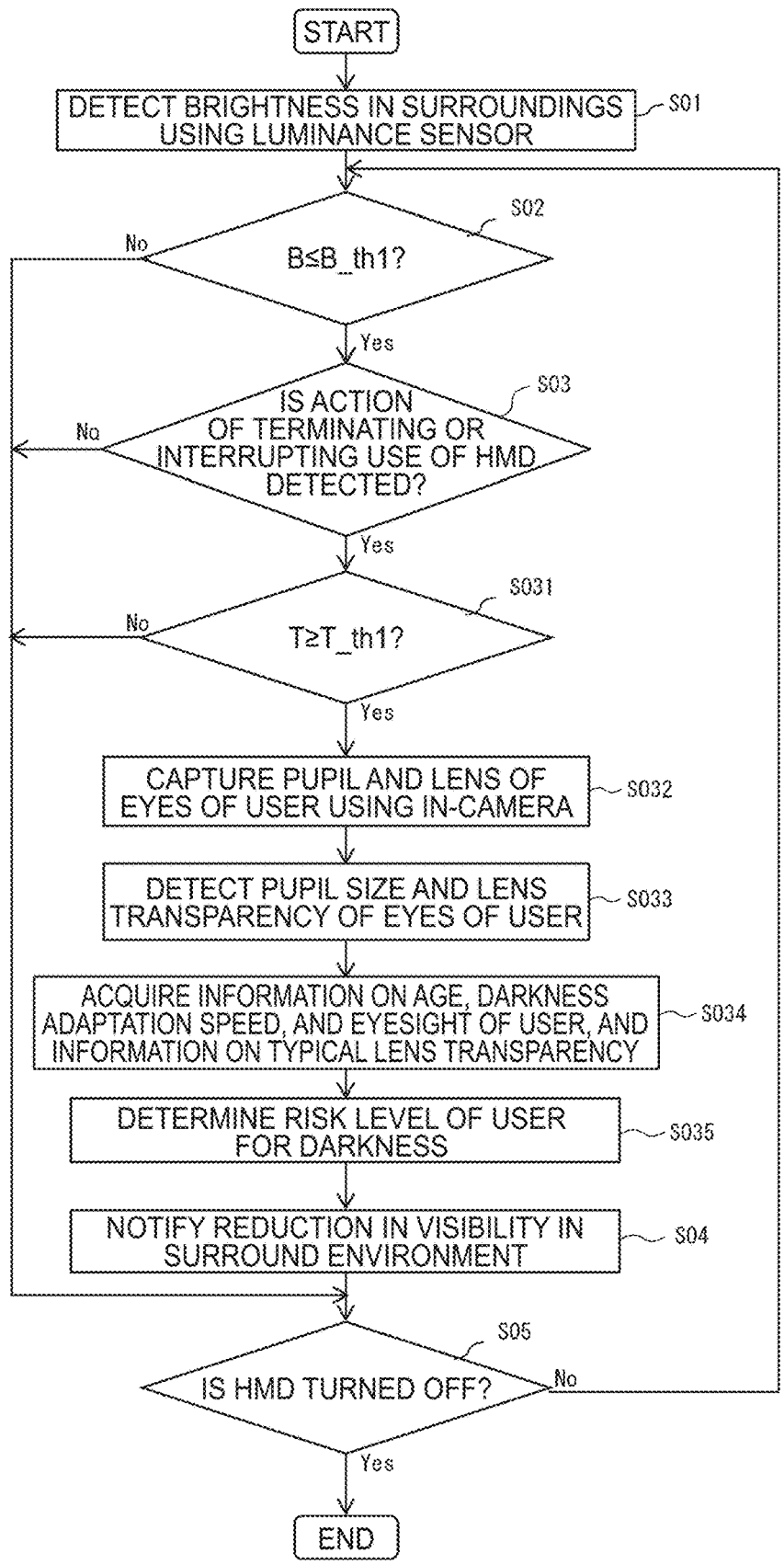
FIG. 12 illustrates a flowchart of a flow of the processing of an HMD according to the third embodiment.

FIG. 12 illustrates a flowchart of a flow of the processing of the HMD according to the third embodiment. In FIG. 12, the same steps as those illustrated in FIG. 10 are provided with the same reference signs, and the repetitive explanation therefor is omitted.

When YES is determined in step S031, a face image including the eyes of the user is captured using the in-camera 112 such that the pupils and the crystalline lens are captured (S032).

The risk level determinator 206 detects the size of the pupils and transparency of the crystalline lens of the user based on the face image (S033). Furthermore, the risk level determinator 206 acquires the information on the age, darkness adaptation speed, and eyesight of the user stored in the memory 128 or server 2 (collectively referred to as "user attribution information") and information on the typical transparency of the crystalline lens (S034).

The risk level determinator 206 refers to the detected and acquired information on the size of the pupils and transparency of the crystalline lens of the user, the user attribute information, and the risk level classification table 410 to acquire the risk level of the user for the darkness. In the case where each information and the risk level classification table 410 are stored in the server 2, they are downloaded from the server 2 through the communication network 9 and used in the determination of the risk level of the user for the darkness (S035).

The notification controller 204 provides a notification depending on the risk level of the user (S04).

Figure 13:
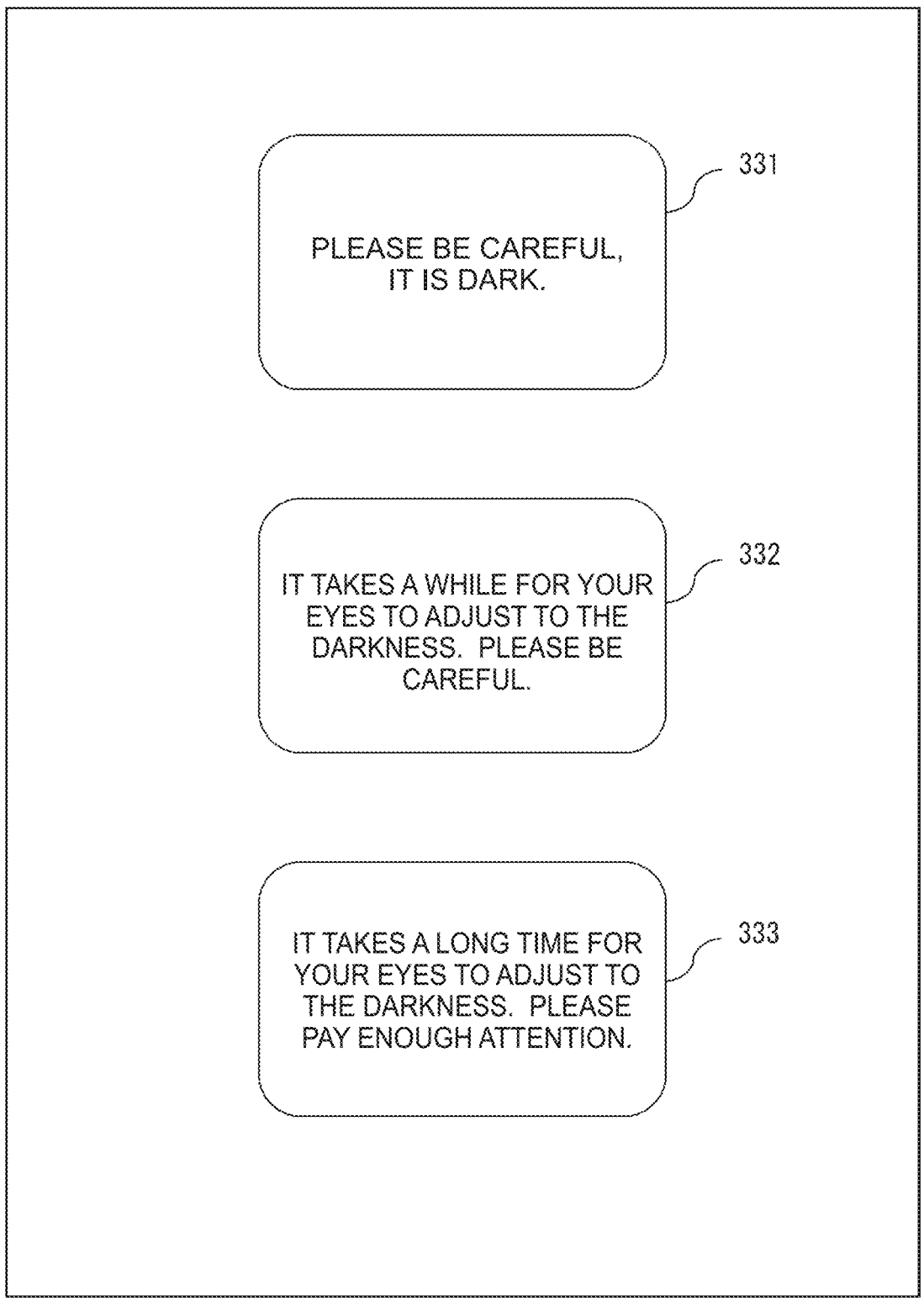
FIG. 13 illustrates notification windows depending on risk levels.

FIG. 13 illustrates notification windows depending on the risk levels.

The notification controller 204 selects either of a notification window 331 for the low-risk level, a notification window 332 for the intermediate-risk level, and a notification window 333 for the high-risk level based on the risk level as determined in S035, and outputs the notification window as selected to the display controller 208 to cause the display controller 208 to display the notification window as selected on the display 119. The brightness of the screen of the display 119 may be changed depending on the risk levels. For example, the brightness of the screen of the display 119 may be controlled to be lowered for the case of the high-risk level.

According to the present embodiment, the risk levels are classified in accordance with the state of the eyes and attribute of the user, which enables notification (including a warning) to be provided depending on the classified risk levels.

Fourth Embodiment

The fourth embodiment is an embodiment for a head-mounted display equipped with the light 131, in which the light 131 is turned on when a surrounding-environment-recognition-preparation-action is detected, and the display 119 is switched from a non-transparent mode to a transparent mode (see-through display), or switched to show a surrounding environment video being captured by the out-camera 111.

Figure 14:
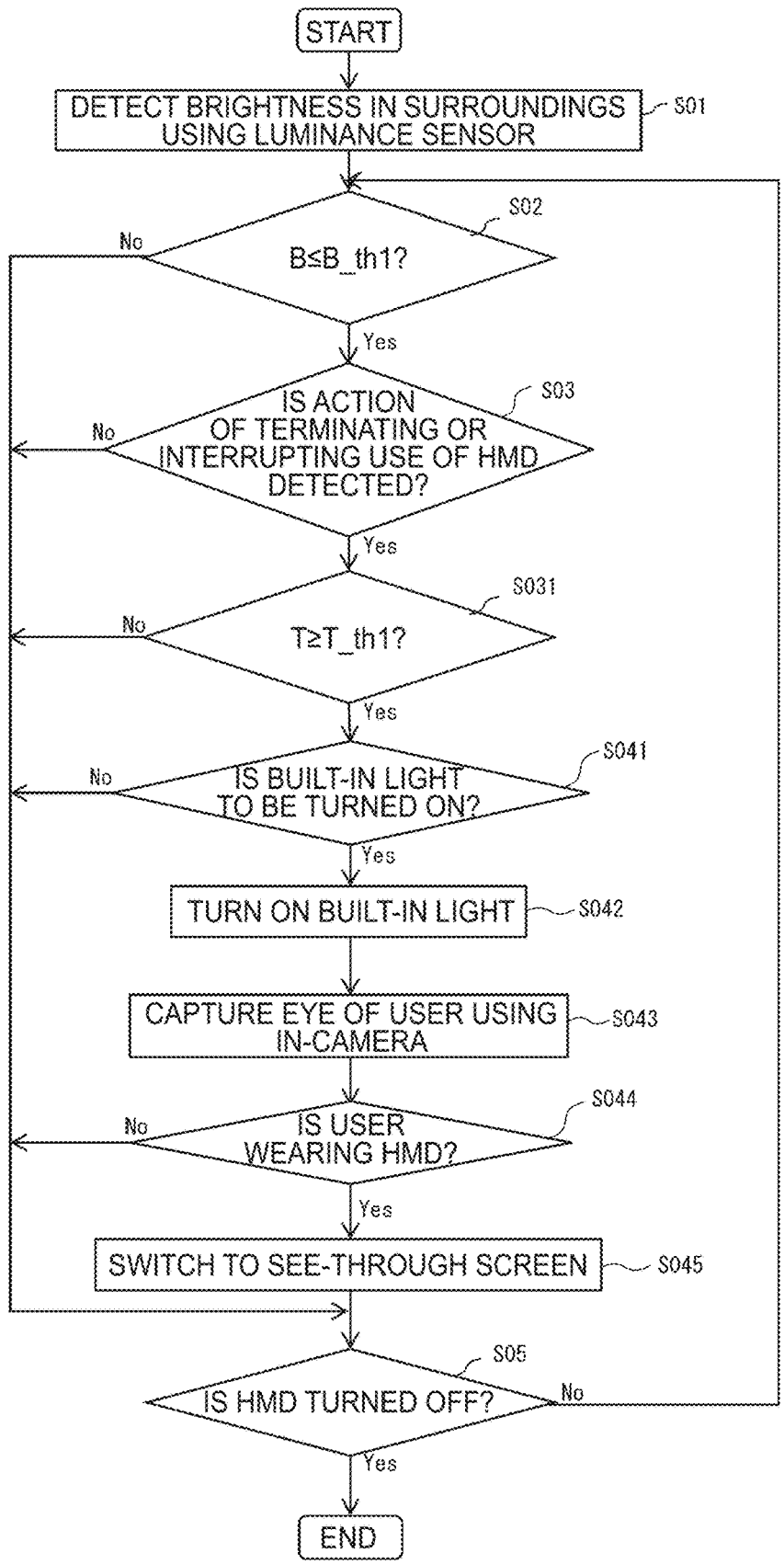
FIG. 14 illustrates a flowchart of a flow of the processing of an HMD according to the fourth embodiment.
Figure 15:
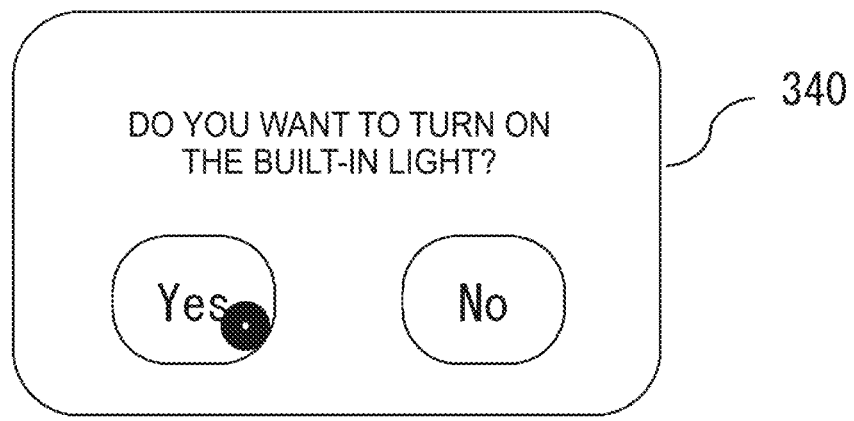
FIG. 15 illustrates an example of an operation window for a light.
Figure 16A:
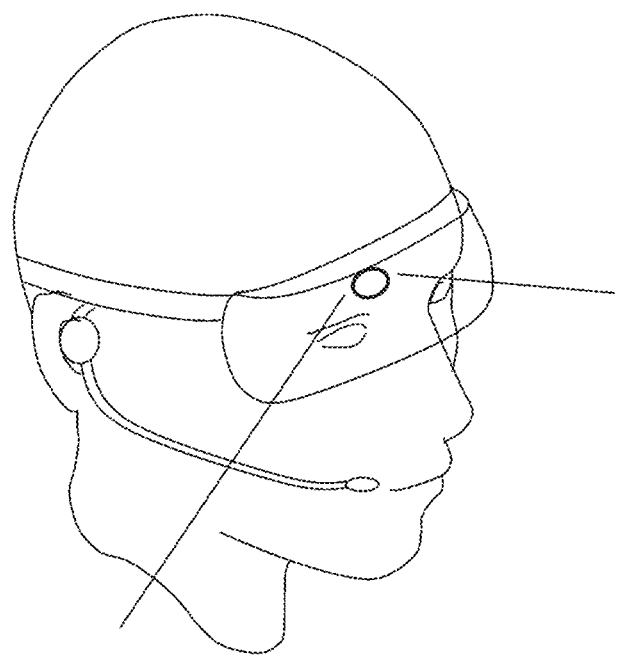
Figure 16B:
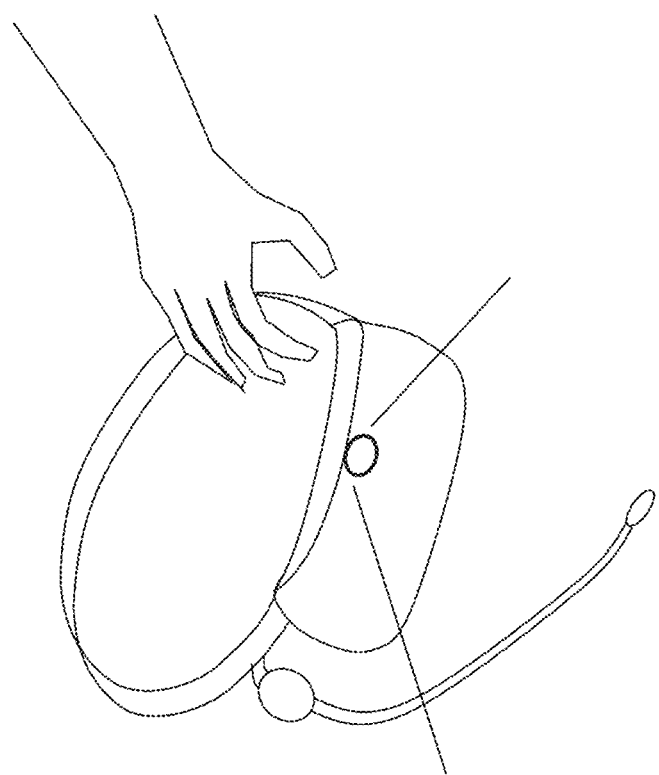

FIG. 14 illustrates a flowchart of a flow of the processing of an HMD according to the fourth embodiment. FIG. 15 illustrates an example of an operation window for a light. FIG. 16A and FIG. 16B illustrate examples of states of a light being turned on, respectively.

The notification controller 204 carries out the notification control in step S04, and causes the display controller 208 to show an operation window 340 for a light (see FIG. 15) on the display 119. When the user does not select to turn on the light (S041: No), the processing proceeds to a termination determination process for the HMD 10 (S05).

On the other hand, when the user selects to turn on the light 131 (S041: Yes), the light controller 207 turns on the light 131 (S042).

Using the in-camera 112, a face image including the eyes of the user is captured (S043), and when it is determined that the eyes of the user are in a standard position (S044: Yes), the display switcher 210 outputs, to the display 119, a signal for causing a shutter of the display 119 to open so as to switch a mode of the display 119 to a transparent display mode. This makes the display 119 see-through (see FIG. 16A) (S045). When the screen of the display 119 had been made see-through, the display of the virtual image may be turned off so that the user can more correctly perceive the state of a surrounding environment. Alternatively, in S045, instead of making the display 119 see-through, the display 119 may be switched to show a surrounding environment video being captured by the out-camera 111. This enables the user to recognize the state in the surrounding environment even if the display 119 is not provided with a transparency change mechanism. Furthermore, for the case where the screen of the display 119 had been made see-through once and the see-through display mode is cancelled after a predetermined period of time has elapsed while the user is wearing the HMD 10, the brightness of the screen of the display 119 may be controlled to be stepped up from the low brightness so as to reduce the burden on the eyes of the user caused by the change in brightness.

Keeping the light 131 to be turned on with the HMD 10 being active (S05: No) after the HMD 10 is taken off allows the surrounding environment to be illuminated (see FIG. 16B).

According to the present embodiment, upon detection of a surrounding-environment-recognition-preparation-action, turning on the light 131 and increasing the transparency or switching the display 119 to show a surrounding environment video being captured by the out-camera 111 enables the user to view the surrounding environment while wearing the HMD 10 and act under the progression of darkness adaption.

Fifth Embodiment

Figure 17:
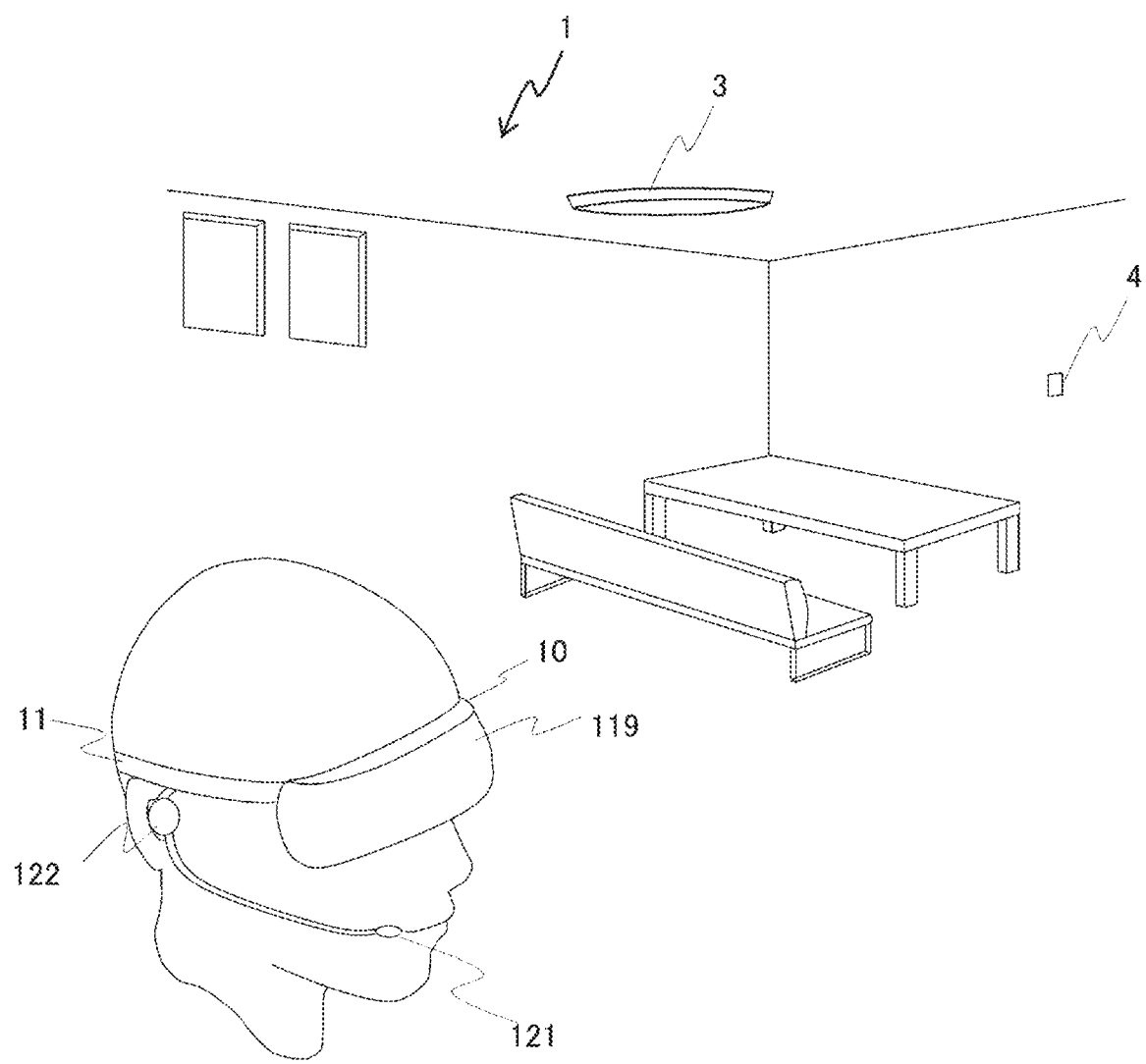
FIG. 17 illustrates an example of a scene to which the fourth embodiment is applied.
Figure 18:
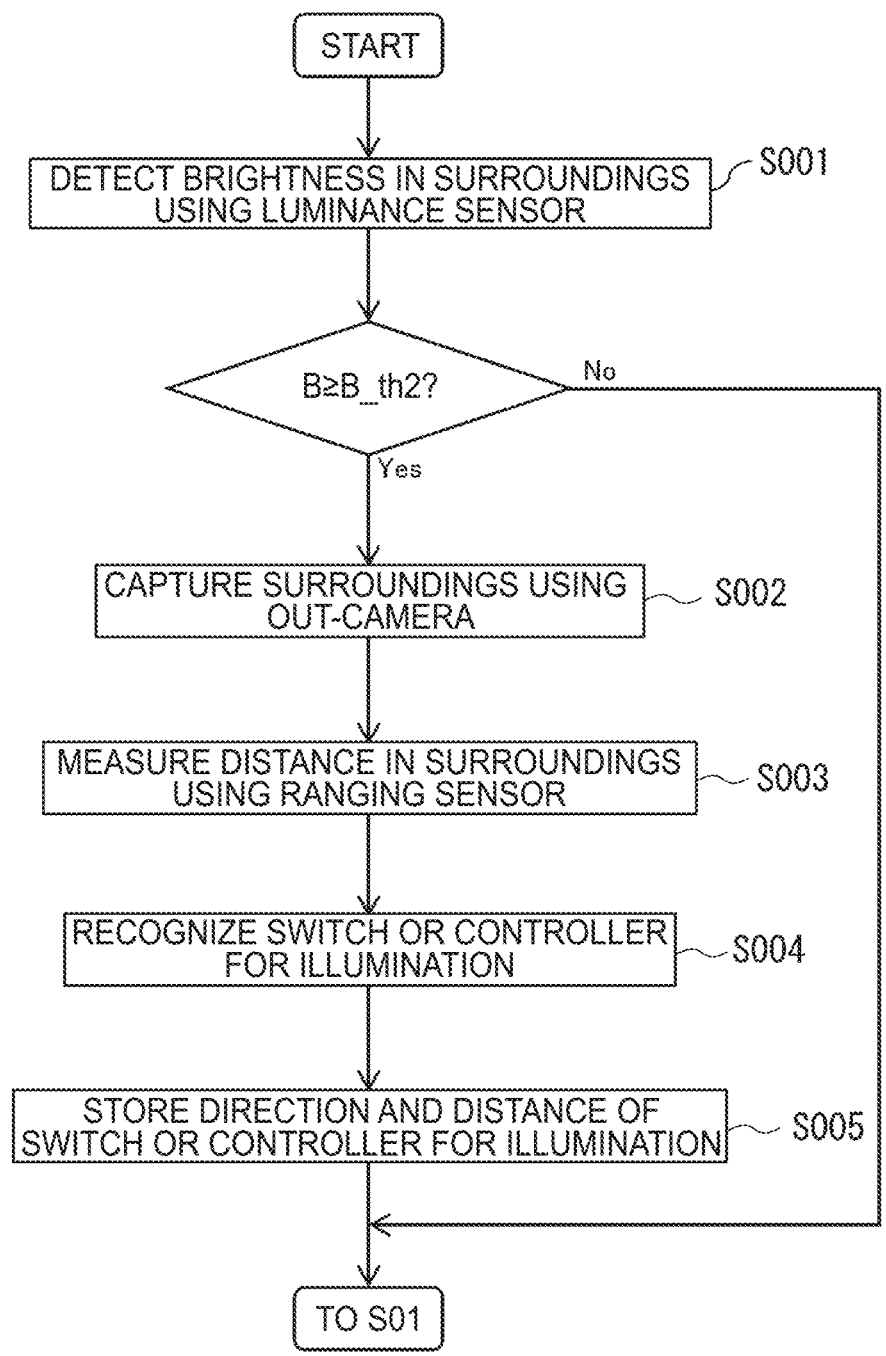
FIG. 18 illustrates a flowchart of a flow of the processing of an HMD according to the fourth embodiment.

The fifth embodiment is an embodiment for the HMD 10 that identifies the direction of a switch 4 or remote controller of a lighting fixture 3 provided in the surrounding environment, and turns on at least a part of the lights 131 toward the switch 4 or remote controller of the lighting fixture 3. FIG. 17 illustrates an example of a scene to which the fourth embodiment is applied. FIG. 18 illustrates a flowchart of a flow of the processing of the HMD 10 according to the fifth embodiment.

As illustrated in FIG. 17, in the present embodiment, the direction and distance of the switch 4 of the lighting fixture 3 installed in a room, which are viewed from the HMD 10, are obtained in advance, and upon detection of a surrounding-environment-recognition-preparation-action, the HMD 10 provides a notification that it is dark in the surrounding environment and also illuminates the switch 4 using the light. The light 131 has a diaphragm mechanism and a mechanism of controlling an irradiation direction, which enables the lights to be collected and irradiated in a specific direction, for example, in the direction in which the switch 4 or controller is located. Furthermore, in the case of the HMD 10 with the plurality of lights 131 at different positions thereon, control may be performed to turn on only a part of the lights 131 which can irradiate the light toward the switch 4 or remote controller of the lighting fixture 3 without controlling collection of lights or controlling an irradiation direction. Controlling them allows the user to know the direction in which the user is to move to turn on the lighting fixture.

As illustrated in FIG. 18, upon activation of the HMD 10, the processing of grasping the surrounding environment is started. Specifically, upon activation of the HMD 10, the surrounding light sensor is used to detect the brightness B in the surrounding environment (S001), and when the brightness in the surrounding environment is equal to or more than a second surrounding light threshold B_th2 provided to determine whether the processing of grasping the surrounding environment is to be started (S002), the out-camera 111 is used to capture the surrounding environment (for example, inside the room) (S003), and also the distance measuring sensor 113 is used to measure the distance to a surrounding region (S004).

The image analyzer 202 analyzes the surrounding environment image, recognizes the switch 4 by the subject recognition processing (S005), and stores the direction and distance of the switch 4 in the HMD 10 (S006). The processes above are included in the processing for grasping the surrounding environment. In this processing, the direction and distance of a remote controller may be measured instead of the switch 4.

Thereafter, the processes after step S01 are executed. It may be configured that, in the notification process in step S04, the notification controller 204 provides a notification that it is dark in the surrounding environment, and also the light controller 207 controls the light irradiation direction of the light 131 in the direction in which the switch 4 or remote controller is located based on the position and distance of the switch 4 or remote controller and the orientation of the HMD 10. At this time, the light controller 207 may control the light 131 to blink for a predetermined time to let the user know that the irradiation direction of the light has been controlled.

The plurality of lights 131 may be provided. In this case, the light controller 207 may control the irradiation direction such that a light of a first light is directed toward the switch 4 and a light of a second light is directed toward the remote controller.

Alternatively, on the display 119 after being made see-through or being switched to show the surrounding environment video being captured by the out-camera 111, an image (line, arrow, or the like) for indicating the direction of the switch 4 or remote controller may be displayed. Instead of the irradiation in a specific direction, the light controller 207 may rotate the irradiation direction of the light 131. These modified examples are particularly advantageous in the case of using the HMD 10 in an unfamiliar location.

Sixth Embodiment

The sixth embodiment is an embodiment for an HMD cooperation system 1 with the HMD 10 and the lighting fixture 3 being cooperated with each other, in which the HMD 10 controls the lighting fixture 3 to be turned on upon detecting the surrounding-environment-recognition-preparation-action.

The HMD cooperation system 1 is configured with the HMD 10 and the lighting fixture 3 being connected to communicate to each other through the communication network 9 (see FIG. 1).

Figure 19:
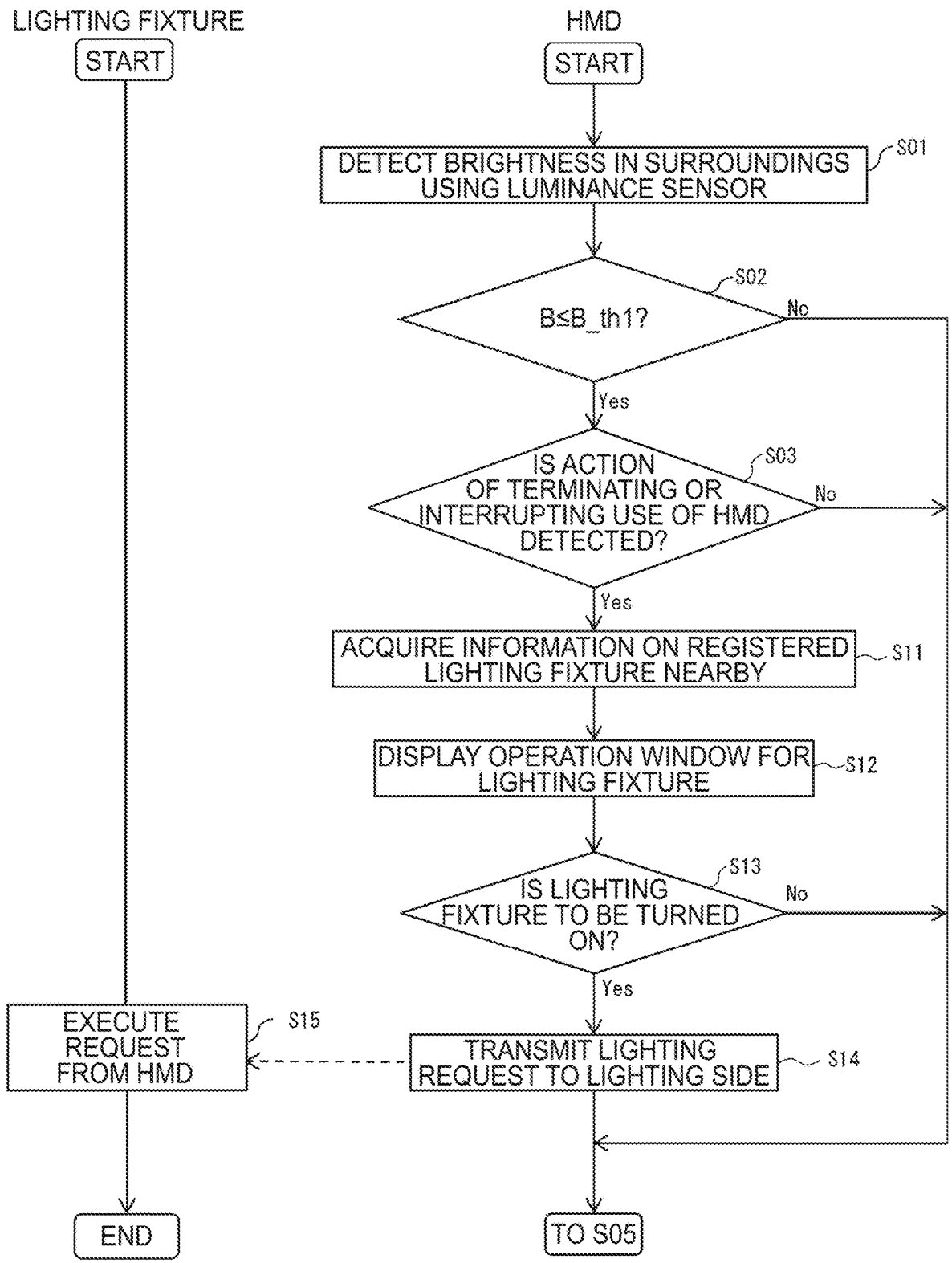
FIG. 19 illustrates a flow of the processing of an HMD cooperation system according to the fifth embodiment.

FIG. 19 illustrates a flow of the processing of the HMD cooperation system 1 according to the fifth embodiment.

Upon activation of the HMD 10, the processor 125 reads a surrounding light monitoring program from the memory 128 and starts the processing. The surrounding light sensor observes the surrounding light around the user of the HMD 10 to detect the brightness in the surrounding environment (S01).

When the surrounding light monitor determines that the brightness B in the surrounding environment based on a result of the measurement by the surrounding light sensor is more than the first surrounding light threshold B_th1 predetermined for providing the user with a warning (S02: No), the processing returns to step S01.

When the surrounding light monitor determines that the brightness B in the surrounding environment is equal to or less than the first surrounding light threshold B_th1 (S02: Yes), and also when the preparation action detector 203 does not detect the surrounding-environment-recognition-preparation-action (S03: No), the processing proceeds to step S05.

On the other hand, when the surrounding light monitor determines that the brightness B in the surrounding environment is equal to or less than the first surrounding light threshold B_th1 (S02: Yes) and also the preparation action detector 203 detects the surrounding-environment-recognition-preparation-action (S03: Yes), the lighting fixture controller 209 acquires the information on the registered lighting fixture located around the HMD 10 (S11). For example, the lighting fixture 3 is identified by the image recognition on a surrounding environment image captured by the out-camera 111.

The lighting fixture controller 209 reads an operation window for the lighting fixture 3 as identified from the data 127 of the memory 128, and the display controller 208 shows it on the display 119 (S12).

In response to an operation of turning on and adjusting the lighting fixture on the operation window (S13: Yes), a control signal for the lighting fixture is generated for the lighting fixture 3 (S14), and the lighting fixture 3 executes the request from the HMD 10 in accordance with the control signal (S15).

According to the present embodiment, upon detection of the surrounding-environment-recognition-preparation-action, lighting of the lighting fixture 3 is controlled such that the burden on the eyes of the user is reduced. As will be described later, various modes can be made by changing the contents on the operation window and the contents of the control signal. Alternatively, lighting of the lighting fixture 3 may be controlled to prevent the user from feeling dazzling.

(First Example of Operation Window for Lighting Fixture)

Figure 20:
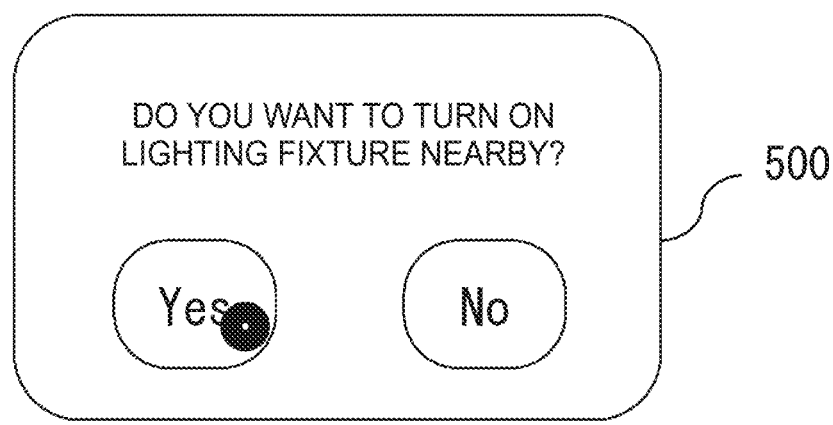
FIG. 20 illustrates an example of an operation window for lighting fixture.

FIG. 20 illustrates an example of an operation window for lighting fixture. An operation window 500 for the lighting fixture 3 illustrated in FIG. 20 is provided for the user to select whether the lighting fixture 3 is to be turned on. When the operation window 500 for the lighting fixture 3 is displayed (S12) and the user provides an instruction to turn on the lighting fixture 3 on the operation window 500 (S13), a control signal for turning on the lighting fixture 3 is transmitted (S14) and the lighting fixture 3 is turned on (S15).

(Second Example of Operation Window for Lighting Fixture)

Figure 21:
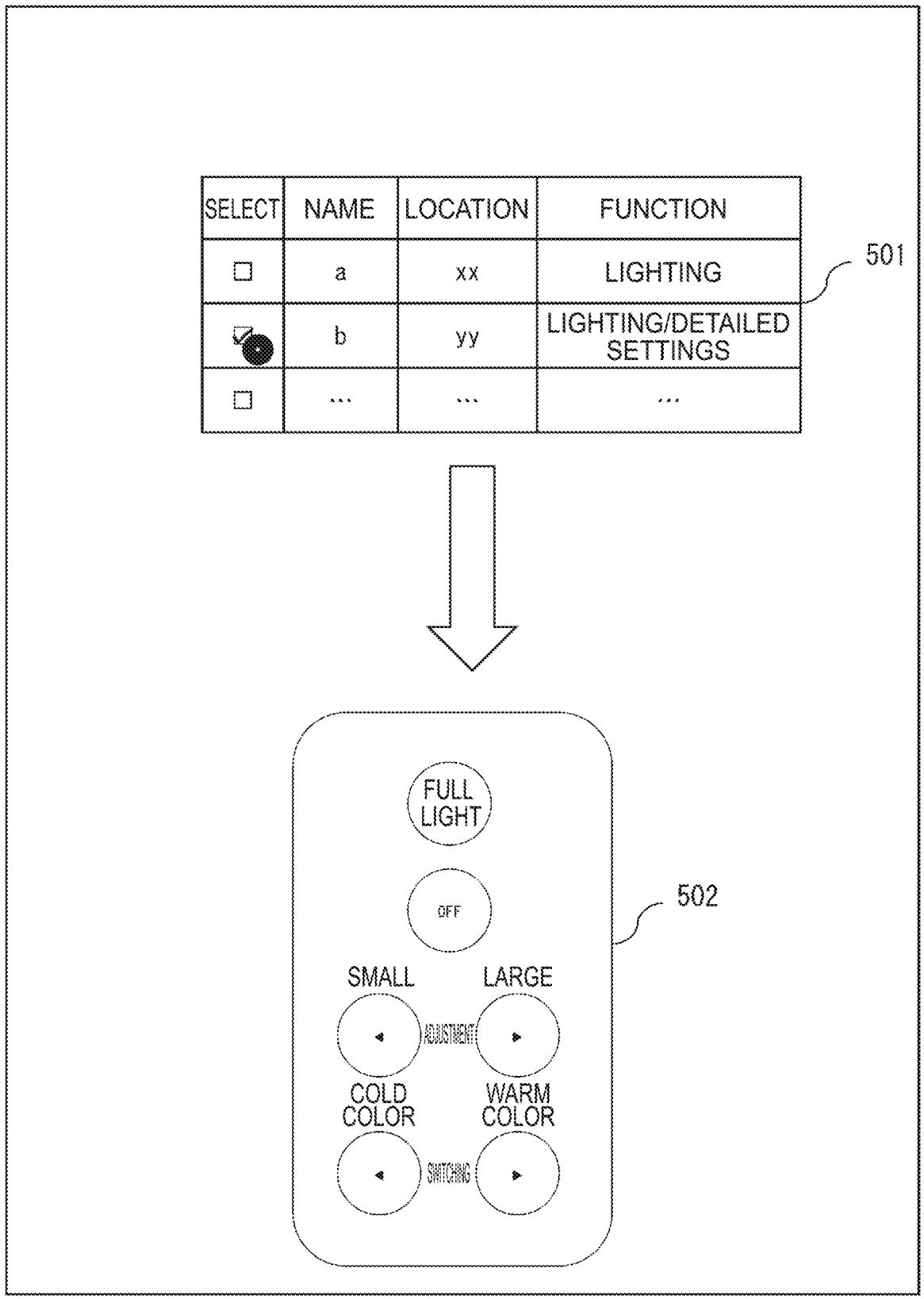
FIG. 21 illustrates an example of an operation window for lighting fixture.

FIG. 21 illustrates an example of an operation window for lighting fixture. In a selection window 501 for the lighting fixture 3 illustrated in FIG. 21, the names, installation locations, and functions of the plurality of lighting fixtures 3 around the HMD 10 are listed in association with each other. When being displayed (S12) and the user selects one of the lighting fixtures 3, the selection window 501 for the lighting fixtures 3 is shifted to an operation window 502 for the lighting fixture 3. In response to the instructions of lighting, adjusting, or switching colors of the lighting fixture 3 made by the user on the operation window 502 (S13), a control signal for lighting, adjusting the light, or switching the colors of the light of the lighting fixture 3 is transmitted (S14) so that the lighting fixture 3 is turned on, the light thereof is adjusted, or the color thereof is switched (S15).

(Third Example of Operation Window for Lighting Fixture)

Figure 22:
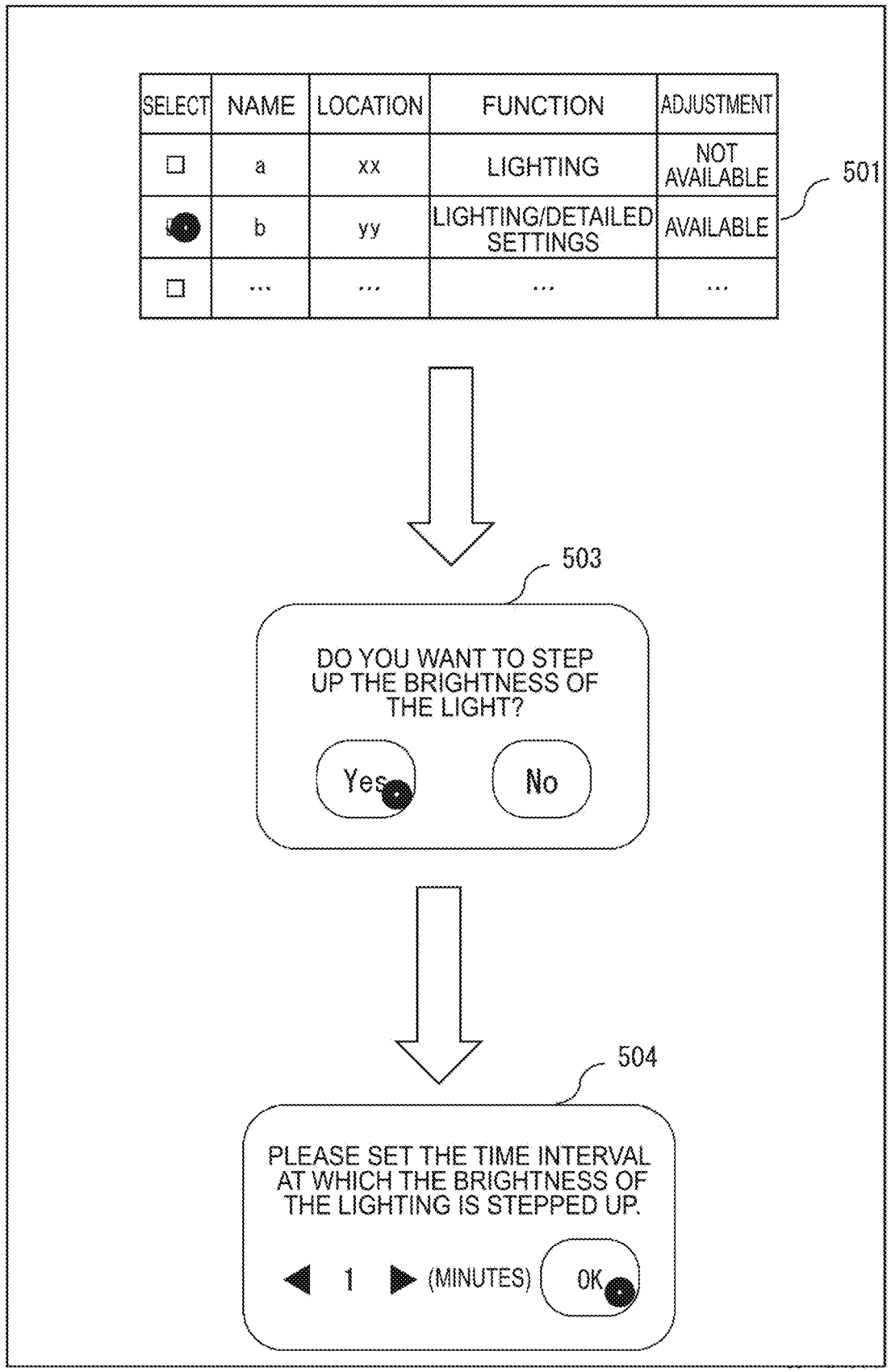
FIG. 22 illustrates an example of an operation window for lighting fixture.

FIG. 22 illustrates an example of an operation window for lighting fixture. In FIG. 22, the selection window 501 for the lighting fixtures 3 is shifted to an operation window 503 that allows the user to provide an instruction as to whether the luminance of the lighting is to be controlled stepwise, and to a setting window 504 that allows the user to set the speed (time interval) at which the luminance of the lighting is stepped up. In response to the selection of "OK" on the setting window 504 (S13), a control signal for stepping up the luminance of the lighting fixture 3 at the time interval as set on the setting window 504 is transmitted (S14), and the lighting fixture 3 increases its luminance (S15).

Seventh Embodiment

The seventh embodiment is an embodiment for an HMD cooperation system with the HMD 10 and the lighting fixture 3 being cooperated with each other, in which, when the surrounding-environment-recognition-preparation-action by the HMD 10 is detected, if the HMD 10 is in a specific condition in which the entire room is preferably brightened, a lighting fixture capable of brightening the entire room is recommended to be turned on. The specific condition includes, for example, the situation where other people are in the same room or nearby, or a pet is coming close the foot of the user.

Figure 23:
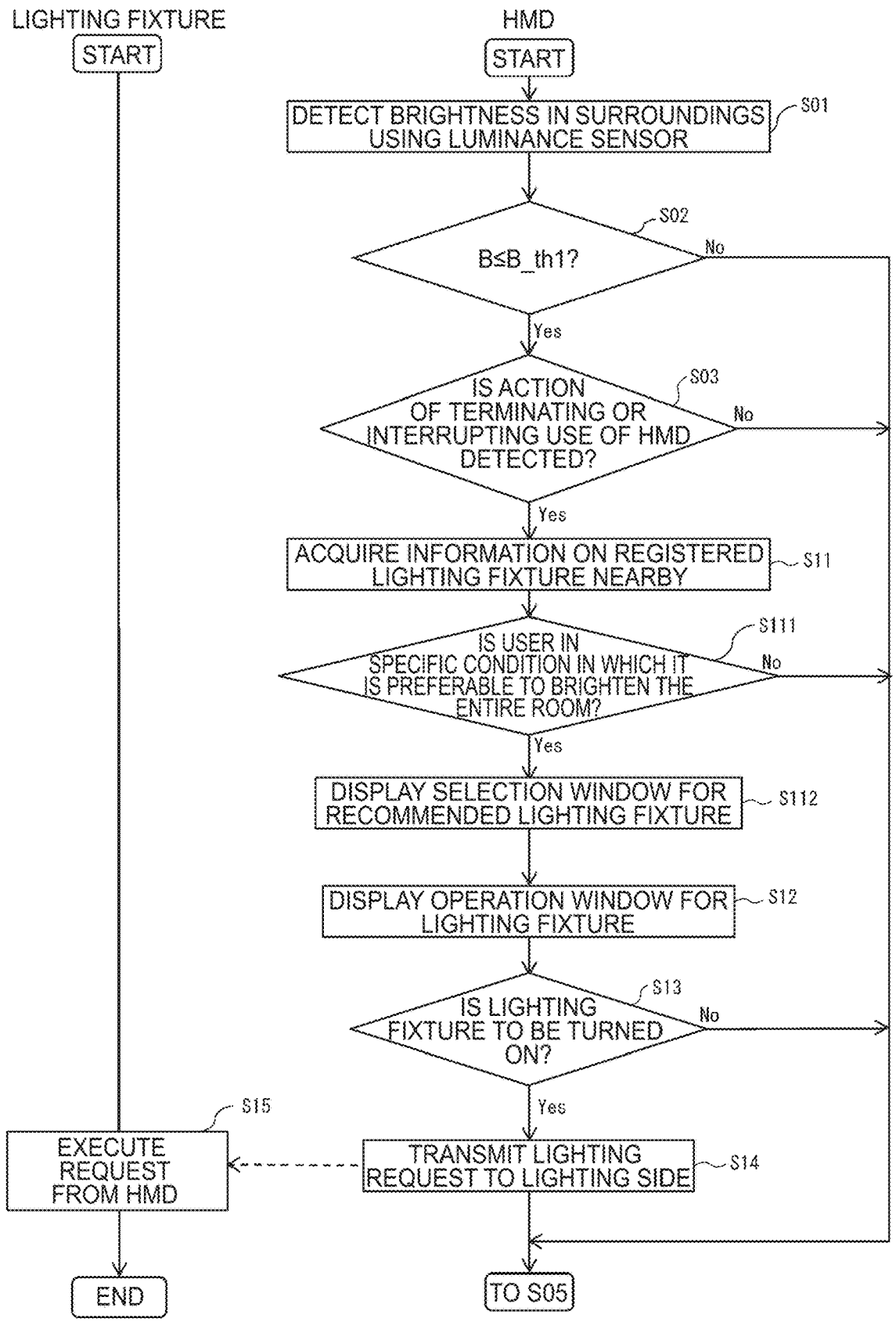
FIG. 23 illustrates a flowchart of a flow of the processing of an HMD cooperation system according to the sixth embodiment.

FIG. 23 illustrates a flowchart of a flow of the processing of an HMD cooperation system according to the sixth embodiment.

When acquiring the information on the registered lighting fixture located around the HMD 10 (S11), the lighting fixture controller 209 determines whether the HMD 10 is in the specific condition (S111). For example, the out-camera 111 is switched to an infrared capturing mode to capture a surrounding environment image, and when other people, a pet, and the like are captured in the surrounding environment image, it is determined that the HMD 10 is in the specific condition.

When determining that the HMD 10 is in the specific condition (S111), the lighting fixture controller 209 generates and displays a recommended lighting fixture selection window in which a recommended lighting fixture capable of illuminating the entire room is preferentially displayed from among a plurality of lighting fixtures (S112).

FIG. 24 illustrates variations of a recommended lighting fixture selection window.

A recommended lighting fixture selection window 511 shows only a lighting fixture (installation location: ceiling) capable of illuminating the entire room from among a plurality of lighting fixtures.

A recommended lighting fixture selection window 512 preferentially shows a lighting fixture (installation location: ceiling) capable of illuminating the entire room.

A recommended lighting fixture selection window 513 highlights and shows a lighting fixture (installation location: ceiling) capable of illuminating the entire room.

A recommended lighting fixture selection window 514 preferentially shows a closest lighting fixture if no lighting fixture (installation location: ceiling) capable of illuminating the entire room is found.

In response to selection of a lighting fixture on any of the recommended lighting fixture selection windows 511 to 514, an operation window for the selected lighting fixture is displayed (S12).

When the HMD 10 is not in the specific condition (S111: No), the lighting fixture controller 209 displays either the operation window 500 or the selection window 501.

According to the present embodiment, a lighting fixture to be turned on can be recommended to a user depending on the situation of the surrounding environment, and when the entire room is preferably brightened, a lighting fixture capable of brightening the entire room is preferentially shown or shown with a highlight. This enables reduction in the decrease of the visibility caused by the difference between the brightness in the surrounding environment and that of the display 119 when the HMD 10 is taken off.

Eighth Embodiment

The eighth embodiment is an embodiment for an HMD cooperation system with the HMD 10 and the lighting fixture 3 being cooperated with each other, in which, when the surrounding-environment-recognition-preparation-action by the HMD 10 is detected, a recommended setting of the brightness of a lighting fixture is proposed depending on the condition that affects the darkness adaptation.

In the present embodiment, in place of or in addition to a warning depending on the classified risk level according to the third embodiment, the processing of proposing a recommended setting of the luminance of a lighting fixture is executed depending on the condition that affects the darkness adaptation.

FIG. 25 illustrates an example of a luminance recommendation table.

In a luminance recommendation table 521, the screen luminance of the display 119 is associated with the luminance of the recommended lighting fixture 3.

In a luminance recommendation table 522, the size of the pupils is associated with the luminance of the recommended lighting fixture 3.

The luminance recommendation tables 521, 522 are stored as the data 127 of the memory 128, and the lighting fixture controller 209 compares the detected size of the pupils (S033) with the luminance recommendation table 522 to decide the recommended luminance. Alternatively, in the processing of proposing a recommended setting, the lighting fixture controller 209 acquires the screen brightness (brightness of the screen) of the display 119, and matches the screen brightness with the luminance recommendation table 521 to decide the recommended brightness. The lighting fixture controller 209 may decide the brightness of the lighting fixture 3 based on both the brightness of the screen and the size of the pupils.

Figure 26:
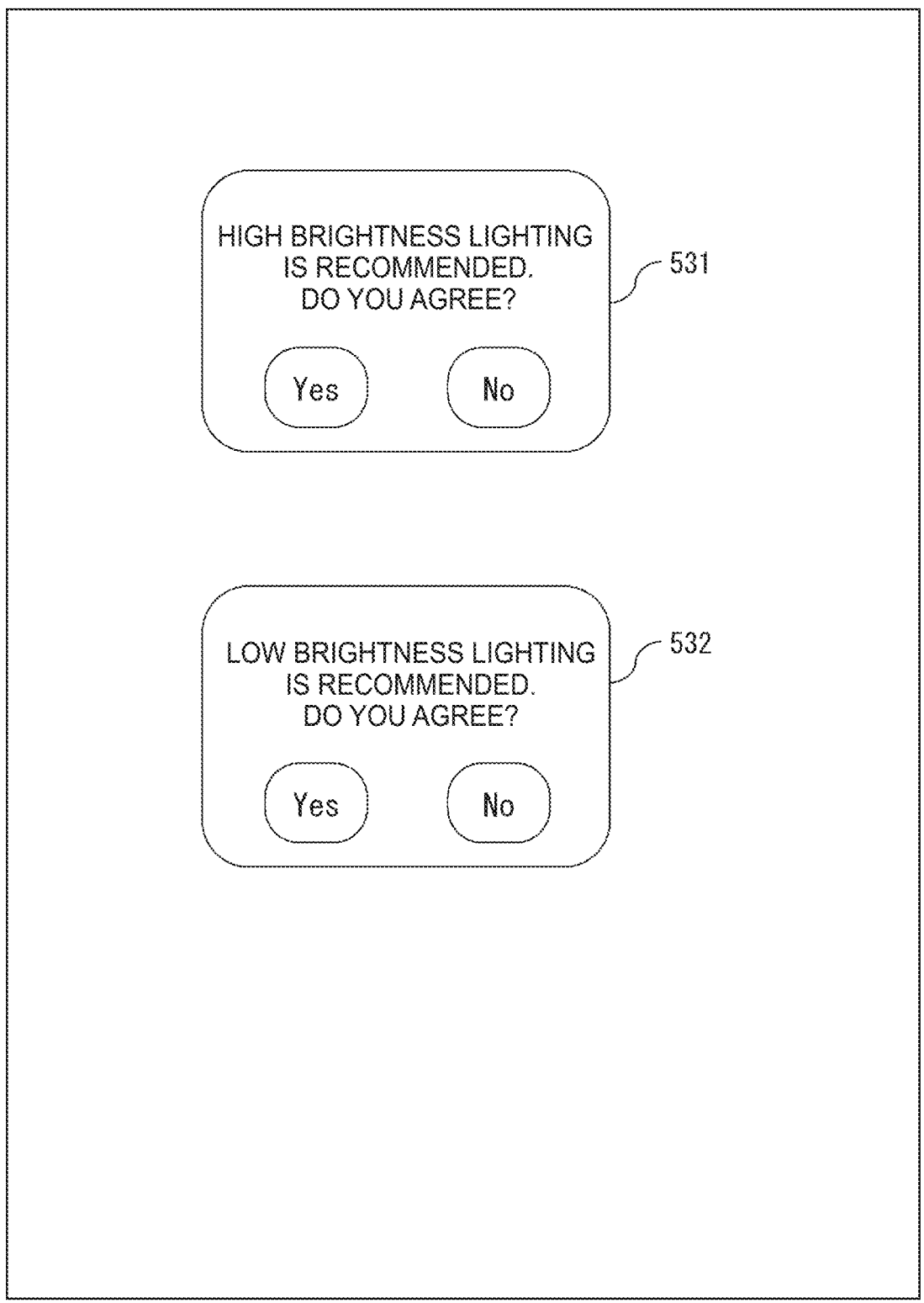
FIG. 26 illustrates an example of a recommended luminance proposal window.

FIG. 26 illustrates an example of a recommended luminance proposal window. In general, when a screen being displayed is bright or the pupils of a user are small, lighting up of the lighting fixture 3 with the brightness that is equal to or more than a normal brightness can reduce the burden on the eyes of the user. A recommended luminance proposal window 531 proposes this and is shown on the display 119. On the other hand, when a screen being displayed is dark or the pupils of a user are large, lighting up of the lighting fixture 3 with the brightness that is darker than usual can reduce the burden on the eyes of the user. Accordingly, a recommended luminance proposal window 532 for recommending a darker screen is shown on the display 119. The lighting fixture controller 209 transmits, to the lighting fixture 3, a control signal indicating the operation contents that have been made on the recommended luminance proposal windows 531, 532.

According to the present embodiment, the brightness of the lighting fixture 3 can be controlled so that the HMD 10 reduces the burden on the eyes of the user.

In the above, the embodiments of the present invention made by the inventors have been specifically described referring to the embodiments. However, of course, the present invention is not limited to the embodiments described above, and various modifications can be made without being departed from the concept of the present invention.

Figure 27:
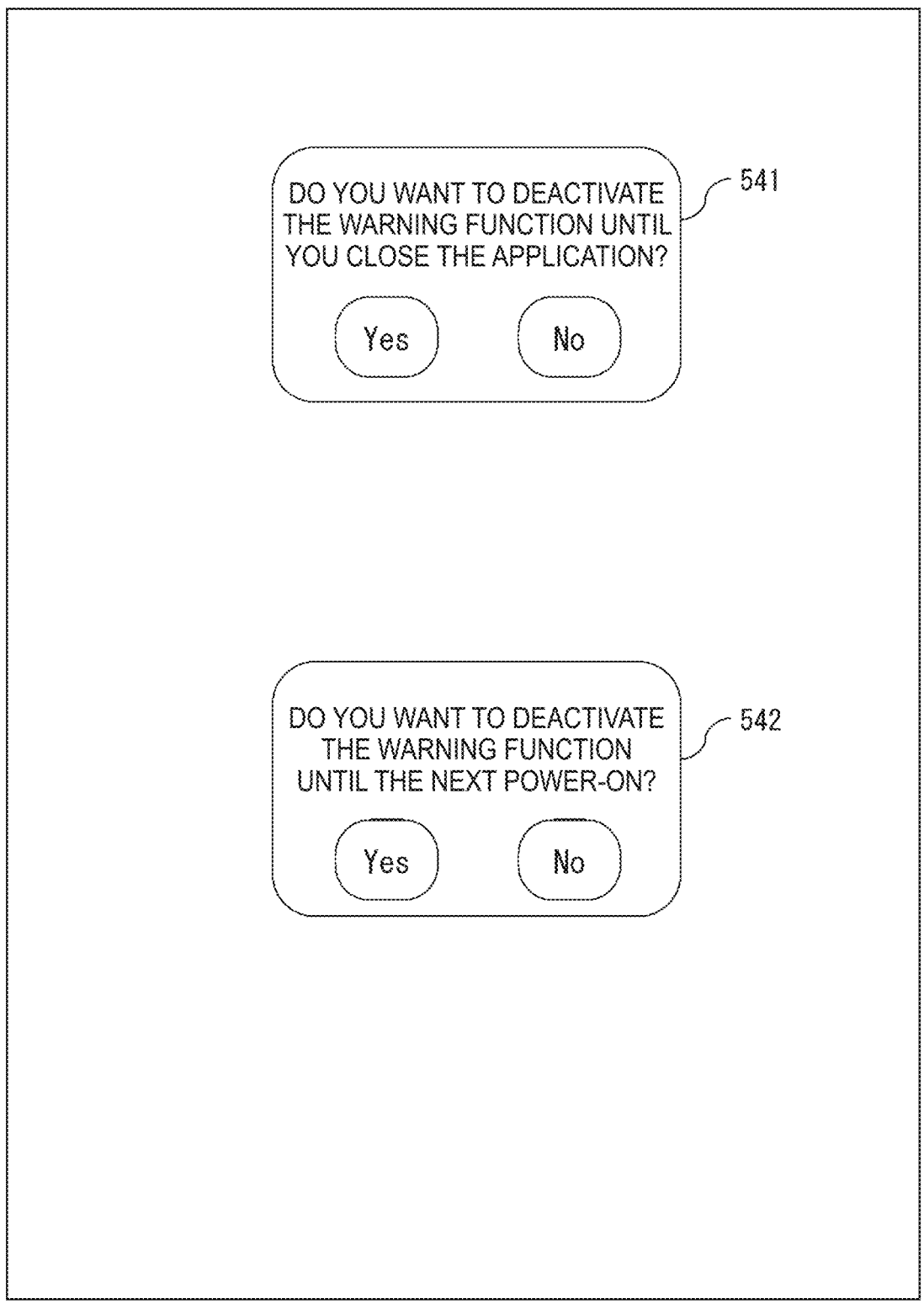
FIG. 27 illustrates an example of a warning stop window.

For example, any combination of the embodiments described above is included in the present invention. Furthermore, modifications for adding functions to each of the embodiments described above can be made. For example, as illustrated in FIG. 27, a modification in which, when a notification of the reduction in the visibility in the surrounding environment was provided in step 04, the processing returned to step S01 without the HMD 10 being terminated in step S05, and then a surrounding-environment-recognition-preparation-action is detected again (S03: Yes), a notification is not provided again may be made.

Specifically, in step S04 for the first time, after providing a notification, as illustrated in FIG. 27, stop windows 541, 542 for stopping the warning function may be shown. The stop window 541 is a window that allows the user to stop the warning until the application is terminated (or closed). The stop window 542 is a window that allows the user to stop the warning function until the HMD 10 is activated for the next time. This can suppress unnecessary notifications from being provided. In this way, modifications within the scope without being departed from the concept of the present invention are included in the present invention.

The numerical values and messages appearing in the text and drawings are merely examples. Accordingly, the advantageous effects of the present invention are not impaired even if different ones are used.

Furthermore, each of the programs described in the examples of the processing may be an independent program, or a plurality of programs configuring one application program. Still further, the orders of executing the processes may be changed.

Still further, some or all the functions and the like of the present invention may be implemented by hardware, for example, by designing them with integrated circuitry. Still further, a processor unit or the like may interpret and execute an operation program for realizing the functions and the like of the present invention, whereby the functions can be implemented by software. Hardware and software may be used in combination.

Still further, the control lines and information lines which are considered to be necessary for the purpose of explanation are indicated herein, but not all the control lines and information lines of actual products are necessarily indicated. It may be considered that almost all the components are actually connected to each other.

The embodiments described above include the following aspects.

(First Aspect)
A head-mounted display comprising:
a processor;
a display with a non-transparency;
a surrounding light sensor for detecting a brightness in a surrounding environment; and
a notification device for outputting notification information to a user of the head-mounted display, and
the processor being configured to:
compare the brightness in the surrounding environment based on a result of measurement by the surrounding light sensor with a surrounding light threshold predetermined for providing the user with a warning; and
when the brightness in the surrounding environment is equal to or less than the surrounding light threshold, and also when detecting that the user wearing the head-mounted display has performed a surrounding-environment-recognition-preparation-action for switching an action of viewing the display to an action of viewing the surrounding environment, execute control of outputting, from the notification device, the notification information for letting the user know that a visibility in the surrounding environment reduces.

(Second Aspect)
A head-mounted display, comprising:
a processor;
a display with a non-transparency;
a surrounding light sensor for detecting a brightness in a surrounding environment; and
a light for illuminating the surrounding environment,
the display having a transparency change mechanism for changing a transparency by means of the processor, and
the processor being configured to:
compare the brightness in the surrounding environment based on a result of measurement by the surrounding light sensor with a surrounding light threshold predetermined for providing a user with a warning; and
when the brightness in the surrounding environment is equal to or less than the surrounding light threshold, and also when detecting that the user wearing the head-mounted display has performed a surrounding-environment-recognition-preparation-action for switching an action of viewing the display to an action of viewing the surrounding environment, execute control of increasing the transparency of the display and also execute control of turning on the light.

(Third Aspect)
A head-mounted display, comprising:
a processor;
a display with a non-transparency;
a surrounding light sensor for detecting a brightness in a surrounding environment;
a light for illuminating the surrounding environment; and
an out-camera for capturing the surrounding environment to generate a surrounding environment image, and
the processor being configured to:
compare the brightness in the surrounding environment based on a result of measurement by the surrounding light sensor with a surrounding light threshold predetermined for providing the user with a warning; and
when the brightness in the surrounding environment is equal to or less than the surrounding light threshold, and also when detecting that the user wearing the head-mounted display has performed a surrounding-environment-recognition-preparation-action for switching an action of viewing the display to an action of viewing the surrounding environment, execute control of displaying a video of the surrounding environment being captured by the out-camera on the display, and execute control of turning on the light.

(Fourth Aspect)
A head-mounted display cooperation system, comprising:
a head-mounted display; and
a lighting fixture,
the head-mounted display and the lighting fixture being cooperated with each other,
the head-mounted display including:
a processor;
a display with a non-transparency;
a surrounding light sensor;
a notification device for outputting notification information to a user of the head-mounted display; and a wireless transceiver for wireless communication with the lighting fixture, and the processor being configured to:
compare a brightness in a surrounding environment based on a sensor output obtained by measurement of the surrounding environment carried out by the surrounding light sensor with a surrounding light threshold predetermined for providing the user with a warning, to monitor whether a state of the surrounding environment falls within an illuminance insufficient state in which the brightness in the surrounding environment is equal to or less than the surrounding light threshold; and in the illuminance insufficient state, when detecting that the user wearing the head-mounted display has performed a surrounding-environment-recognition-preparation-action for switching an action of viewing the display to an action of viewing the surrounding environment, execute control of transmitting a lighting up instruction signal through the wireless transceiver to the lighting fixture.

(Fifth Aspect)

A head-mounted display cooperation system, comprising:
a head-mounted display; and
a lighting fixture,
the head-mounted display and the lighting fixture being cooperated with each other,
the head-mounted display including:
a processor;
a display with a non-transparency;
a surrounding light sensor; and
a wireless transceiver for wireless communication with the lighting fixture, and the processor being configured to:
compare a brightness in a surrounding environment based on a sensor output obtained by measurement of the surrounding environment carried out by the surrounding light sensor with a surrounding light threshold predetermined for providing a user with a warning, to monitor whether a state of the surrounding environment falls within an illuminance insufficient state in which the brightness in the surrounding environment is equal to or less than the surrounding light threshold; and in the illuminance insufficient state, when detecting that a surrounding-environment-recognition-preparation-action in which an action of the user shifts from an action of viewing the display to an action of viewing the surrounding environment, execute control of displaying, on the display, a selection window for at least one lighting fixture associated with the head-mounted display or an operation window for the lighting fixture.

(Sixth Aspect)

A head-mounted display cooperation system, comprising:
a head-mounted display; and
a lighting fixture,
the head-mounted display and the lighting fixture being cooperated with each other,
the head-mounted display including:
a processor;
a display with a non-transparency;
a surrounding light sensor;
an obstacle detection sensor for detecting an object around a user of the head-mounted display;
a notification device for outputting notification information to the user; and
a wireless transceiver for wireless communication with the lighting fixture, and the processor being configured to:
compare a brightness in a surrounding environment based on a sensor output obtained by measurement of the surrounding environment carried out by the surrounding light sensor with a surrounding light threshold predetermined for providing the user with a warning, to monitor whether a state of the surrounding environment falls within an illuminance insufficient state in which the brightness in the surrounding environment is equal to or less than the surrounding light threshold; and in the illuminance insufficient state, when detecting that the user wearing the head-mounted display has performed a surrounding-environment-recognition-preparation-action for switching an action of viewing the display to an action of viewing the surrounding environment, execute control of determining whether an obstacle is present within a distance range defined to determine whether the obstacle hinders an action of the user based on a sensor output from the obstacle detection sensor, and execute control of an output from the notification device so as to change a format of the output of the notification information relating to the lighting fixture depending on a result of obstacle detection when the obstacle has been detected.

(Seventh Aspect)

A method of controlling a head-mounted display, comprising:
comparing a brightness in a surrounding environment based on a result of measurement by a surrounding light sensor with a surrounding light threshold predetermined for providing a user with a warning; and when the brightness in the surrounding environment is equal to or less than the surrounding light threshold, and also when detecting that the user wearing the head-mounted display has performed a surrounding-environment-recognition-preparation-action for switching an action of viewing a display to an action of viewing the surrounding environment, executing control of outputting notification information for letting the user know that a visibility in the surrounding environment reduces, or executing control of outputting a control signal for a lighting fixture.

REFERENCE SIGNS LIST

1: HMD cooperation system
2: server
3: lighting fixture
4: switch
9: communication network
10: HMD
11: wearing body
16: gyro sensor
111: out-camera
112: in-camera
113: ranging sensor
114: illumination sensor
115: acceleration sensor
116: gyro sensor
117: geomagnetic sensor
118: GPS receiver
119: display
120: network transceiver 121: microphone
122: speaker
123: antenna
124: timer
125: processor
126: program
127: data
128: memory
130: power button
131: light
140: bus
201: surrounding light monitor
202: image analyzer
203: preparation action detector
204: notification controller
205: communication controller
206: risk level determinator
207: light controller
208: display controller
209: lighting fixture controller
210: display switcher
301: window
302: termination selection window
303: operation window
304: pausing window
310: warning message
331: notification window
332: notification window
333: notification window
340: operation window
410: risk level classification table
500: operation window
501: selection window
502: operation window
503: operation window
504: setting window
511: recommended lighting fixture selection window
512: recommended lighting fixture selection window
513: recommended lighting fixture selection window
514: recommended lighting fixture selection window
521: luminance recommendation table
522: luminance recommendation table
531: recommended luminance proposal window
532: recommended luminance proposal window
541: stop window
542: stop window

The invention claimed is:

1. A head-mounted display comprising:
a processor;
a display with a non-transparency;
a surrounding light sensor for detecting a brightness in a surrounding environment; and
a notification device for outputting notification information to a user of the head-mounted display, and
the processor being configured to:
compare the brightness in the surrounding environment based on a result of measurement by the surrounding light sensor with a surrounding light threshold predetermined for providing the user with a warning; and
when the brightness in the surrounding environment is equal to or less than the surrounding light threshold, and also when detecting that the user wearing the head-mounted display has performed a surrounding-environment-recognition-preparation-action for switching an action of viewing the display to an action of viewing the surrounding environment, execute control of outputting, from the notification device, the notification information for letting the user know that a visibility in the surrounding environment reduces.

2. The head-mounted display according to claim 1, wherein
the surrounding-environment-recognition-preparation-action is an operation of turning off the head-mounted display or an action of terminating at least one application being executed on the head-mounted display.

3. The head-mounted display according to claim 1, wherein
the surrounding-environment-recognition-preparation-action is an operation of stopping a movie being played on the head-mounted display.

4. The head-mounted display according to claim 1, further comprising an out-camera for capturing the surrounding environment to generate a surrounding environment image, wherein
the surrounding-environment-recognition-preparation-action is an action in which the user is placing a hand to the head-mounted display, and
the processor executes the control of outputting the notification information from the notification device when determining that, based on a result of image analysis on the surrounding environment image, the action in which the user is placing the hand to the head-mounted display is captured in the surrounding environment image.

5. The head-mounted display according to claim 1, further comprising at least one of a gyro sensor or an acceleration sensor, wherein
the surrounding-environment-recognition-preparation-action is an action in which the user is tilting user's head downward by an angle that is equal to or more than a predetermined angle threshold, and
the processor executes the control of outputting the notification information from the notification device when determining that, based on a result of analysis on a sensor output measured by at least one of the gyro sensor or the acceleration sensor, the head of the user is tilted downward by the angle that is equal to or more than the predetermined angle threshold.

6. The head-mounted display according to claim 1, further comprising an in-camera for capturing a face area including eyes of the user of the head-mounted display to generate a face image, wherein
the surrounding-environment-recognition-preparation-action is an action of making a position where the eyes of the user are captured in the face image deviate from a predetermined standard position, and
the processor executes the control of outputting the notification information from the notification device when determining that, based on a result of analysis on the face image, an area in which the eyes of the user are captured included in the face image deviates from the standard position.

7. The head-mounted display according to claim 1, further comprising an in-camera for capturing a face area including eyes of the user of the head-mounted display to generate a face image, wherein
the processor is configured to:
analyze the face image to evaluate a state of the eyes of the user;
classify risk levels defined in a plurality of stages in accordance with at least one of a result of evaluation of the state of the eyes of the user, information on darkness adaptation speed of the user, an age of the user, or an eyesight of the user; and executes the control of outputting, from the notification device, the notification information including a warning depending on the risk levels as classified.

8. A head-mounted display, comprising:

a processor;

a display with a non-transparency;

a surrounding light sensor for detecting a brightness in a surrounding environment; and a light for illuminating the surrounding environment, the display having a transparency change mechanism for changing a transparency by means of the processor, and the processor being configured to:

compare the brightness in the surrounding environment based on a result of measurement by the surrounding light sensor with a surrounding light threshold pre-determined for providing a user with a warning; and when the brightness in the surrounding environment is equal to or less than the surrounding light threshold, and also when detecting that the user wearing the head-mounted display has performed a surrounding-environment-recognition-preparation-action for switching an action of viewing the display to an action of viewing the surrounding environment, execute control of increasing the transparency of the display and also execute control of turning on the light.

9. The head-mounted display according to claim 8, further comprising an out-camera for capturing the surrounding environment to generate a surrounding environment image, wherein the processor is configured to:

compare the brightness in the surrounding environment based on a result of measurement by the surrounding light sensor with a surrounding light threshold pre-determined for providing the user with a warning; and when the brightness in the surrounding environment is equal to or less than the surrounding light threshold, and also when detecting that the user wearing the head-mounted display has performed a surrounding-environment-recognition-preparation-action for switching an action of viewing the display to an action of viewing the surrounding environment, execute control of carrying out subject recognition processing on the surrounding environment image to identify a switch of a lighting fixture located in the surrounding environment, and further execute control of generating an image for indicating a direction to the switch to show the image on the display.

10. A head-mounted display, comprising:

a processor;

a display with a non-transparency;

a surrounding light sensor for detecting a brightness in a surrounding environment;

a light for illuminating the surrounding environment; and an out-camera for capturing the surrounding environment to generate a surrounding environment image, and the processor being configured to:

compare the brightness in the surrounding environment based on a result of measurement by the surrounding light sensor with a surrounding light threshold pre-determined for providing a user with a warning; and when the brightness in the surrounding environment is equal to or less than the surrounding light threshold, and also when detecting that the user wearing the head-mounted display has performed a surrounding-environment-recognition-preparation-action for switching an action of viewing the display to an action of viewing the surrounding environment, execute control of displaying a video of the surrounding environment being captured by the out-camera on the display, and execute control of turning on the light.

11. The head-mounted display according to claim 10, wherein the processor is configured to:

compare the brightness in the surrounding environment based on a result of measurement by the surrounding light sensor with a surrounding light threshold pre-determined for providing the user with a warning; and when the brightness in the surrounding environment is equal to or less than the surrounding light threshold, and also when detecting that the user wearing the head-mounted display has performed a surrounding-environment-recognition-preparation-action for switching an action of viewing the display to an action of viewing the surrounding environment, execute control of carrying out subject recognition processing on the surrounding environment image to identify a switch of a lighting fixture located in the surrounding environment, and further execute control of generating an image for indicating a direction to the switch to show the image on the display.

* * * * *